(12) United States Patent
Jung et al.

(10) Patent No.: US 11,832,312 B2
(45) Date of Patent: Nov. 28, 2023

(54) METHOD AND APPARATUS FOR RANDOM ACCESS IN WIRELESS COMMUNICATION SYSTEM

(71) Applicant: Samsung Electronics Co., Ltd., Suwon-si (KR)

(72) Inventors: Byounghoon Jung, Suwon-si (KR); Sangho Lee, Suwon-si (KR); Jiyoung Cha, Suwon-si (KR); Hyunjoong Lee, Suwon-si (KR); Jungsoo Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 94 days.

(21) Appl. No.: 17/523,360

(22) Filed: Nov. 10, 2021

(65) Prior Publication Data

US 2022/0150987 A1 May 12, 2022

(30) Foreign Application Priority Data

Nov. 11, 2020 (KR) .......................... 10-2020-0150450

(51) Int. Cl.
*H04W 74/08* (2009.01)
*H04L 5/00* (2006.01)

(52) U.S. Cl.
CPC ....... *H04W 74/0841* (2013.01); *H04L 5/0051* (2013.01); *H04W 74/0866* (2013.01)

(58) Field of Classification Search
CPC ............... H04L 5/0051; H04L 5/0053; H04W 74/0841; H04W 74/0866
See application file for complete search history.

(56) References Cited

U.S. PATENT DOCUMENTS

| 8,923,218 | B2 | 12/2014 | Luo et al. | |
|---|---|---|---|---|
| 10,084,582 | B2 | 9/2018 | Ly et al. | |
| 2018/0279364 | A1 | 9/2018 | Hui et al. | |
| 2018/0368187 | A1* | 12/2018 | Jung | ................... H04W 72/542 |
| 2019/0053312 | A1* | 2/2019 | Xia | ...................... H04B 7/0695 |

(Continued)

FOREIGN PATENT DOCUMENTS

| KR | 10-2018-0109047 A | 10/2018 |
|---|---|---|
| KR | 10-2019-0094178 A | 8/2019 |

OTHER PUBLICATIONS

Ericsson; OnQCL; 3GPP TSG-RAN WG1 #89; R1-1708710; May 15-19, 2017; Hangzhou, China; published May 6, 2017.

(Continued)

*Primary Examiner* — Kashif Siddiqui
(74) *Attorney, Agent, or Firm* — Jefferson IP Law, LLP

(57) ABSTRACT

The disclosure relates to a 5th generation (5G) or 6th generation (6G) communication system for supporting a higher data transmission rate than a post-4th Generation (4G) communication system such as long-term evolution (LTE). A method of performing random access by a user equipment (UE) in a wireless communication system is provided. The method includes receiving a first signal including at least one reference signal from a base station (BS), measuring the at least one reference signal and transmitting a second signal to the BS through first uplink resources corresponding to a selected reference signal, and transmitting a random access preamble through a physical random access channel (PRACH) resource corresponding to the selected reference signal.

20 Claims, 32 Drawing Sheets

(56) References Cited

U.S. PATENT DOCUMENTS

| | | | | |
|---|---|---|---|---|
| 2019/0230545 A1* | 7/2019 | Liou | ................... | H04W 24/10 |
| 2019/0239212 A1* | 8/2019 | Wang | ................... | H04L 5/0051 |
| 2019/0320469 A1* | 10/2019 | Huang | ................. | H04W 72/23 |
| 2020/0196162 A1* | 6/2020 | Vargas | .................... | H04W 4/40 |
| 2021/0006456 A1* | 1/2021 | Kim | .................... | H04L 41/0668 |
| 2021/0051667 A1* | 2/2021 | Yang | .................... | H04W 72/23 |

OTHER PUBLICATIONS

Chakrapani; On the Design Details of SS/PBCH, Signal Generation and PRACH in 5G-NR; IEEE Access; vol. 8, 2020; Bridgewater, NJ; published Jul. 20, 2020.

NTT Docomo, Inc.; Views on beam correspondence enhancement based on SSB in Rel-16; 3GPP TSG-RAN WG4 Meeting # 94-e-Bis; R4-2003468; Apr. 20-30, 2020; Electronic Meeting; published Apr. 10, 2020.

CATT; Summary of offline discussion on PRACH configuration conflict detection; 3GPP TSG RAN WG1 #99; R1-1913345; Nov. 18-22, 2019; Reno, Nevada; published Nov. 21, 2019.

International Search Report and Written Opinion dated Feb. 11, 2022 for International App. No. PCT/KR2021/016297.

* cited by examiner

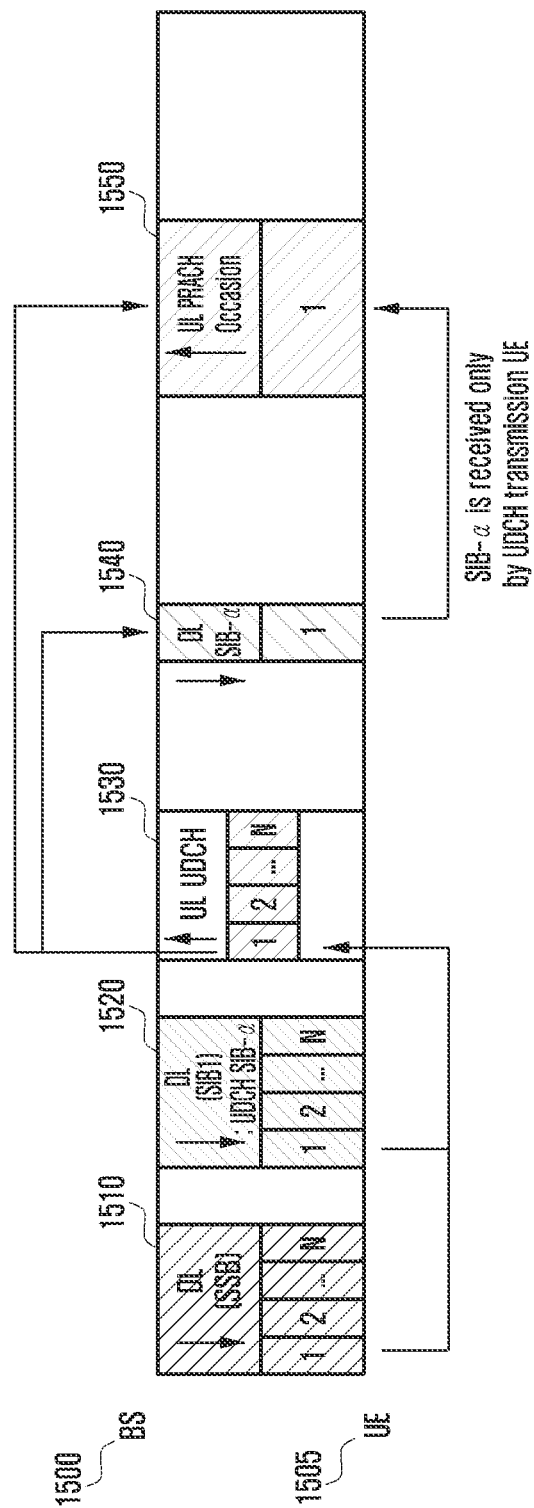

METHOD AND APPARATUS FOR RANDOM ACCESS IN WIRELESS COMMUNICATION SYSTEM

CROSS-REFERENCE TO RELATED APPLICATION(S)

This application is based on and claims priority under 35 U.S.C. § 119(a) of a Korean patent application number 10-2020-0150450, filed on Nov. 11, 2020, in the Korean Intellectual Property Office, the disclosure of which is incorporated by reference herein in its entirety.

BACKGROUND

1. Field

The disclosure relates to a wireless communication system. More particularly, the disclosure relates to a method and an apparatus for performing random access to a base station (BS) by a user equipment (UE) in a wireless communication system.

2. Description of Related Art

A review of the development of mobile communication from generation to generation shows that the development has mostly been directed to technologies for services targeting humans, such as voice-based services, multimedia services, and data services. It is expected that connected devices which are exponentially increasing after commercialization of 5th generation (5G) communication systems will be connected to communication networks. Examples of things connected to networks may include vehicles, robots, drones, home appliances, displays, smart sensors connected to various infrastructures, construction machines, and factory equipment. Mobile devices are expected to evolve in various formfactors, such as augmented reality glasses, virtual reality headsets, and hologram devices. In order to provide various services by connecting hundreds of billions of devices and things in the 6th generation (6G) era, there have been ongoing efforts to develop improved 6G communication systems. For these reasons, 6G communication systems are referred to as Beyond-5G systems.

6G communication systems, which are expected to be implemented approximately by 2030, will have a maximum transmission rate of tera (1,000 giga)-level bps and a radio latency of 100 μsec, and thus will be 50 times as fast as 5G communication systems and have the 1/10 radio latency thereof.

In order to accomplish such a high data transmission rate and an ultra-low latency, it has been considered to implement 6G communication systems in a terahertz band (for example, 95 GHz to 3 THz bands). It is expected that, due to severer path loss and atmospheric absorption in the terahertz bands than those in mmWave bands introduced in 5G, a technology capable of securing the signal transmission distance (that is, coverage) will become more crucial. It is necessary to develop, as major technologies for securing the coverage, multiantenna transmission technologies including radio frequency (RF) elements, antennas, novel waveforms having a better coverage than orthogonal frequency division multiplexing (OFDM), beamforming and massive multiple input multiple output (MIMO), full dimensional MIMO (FD-MIMO), array antennas, and large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the frequency efficiencies and system networks, the following technologies have been developed for 6G communication systems: a full-duplex technology for enabling an uplink (UE transmission) and a downlink (node B transmission) to simultaneously use the same frequency resource at the same time; a network technology for utilizing satellites, high-altitude platform stations (HAPS), and the like in an integrated manner; a network structure innovation technology for supporting mobile nodes B and the like and enabling network operation optimization and automation and the like; a dynamic spectrum sharing technology though collision avoidance based on spectrum use prediction, an artificial intelligence (AI)-based communication technology for implementing system optimization by using AI from the technology design step and internalizing end-to-end AI support functions; and a next-generation distributed computing technology for implementing a service having a complexity that exceeds the limit of UE computing ability by using super-high-performance communication and computing resources (mobile edge computing (MEC), clouds, and the like). In addition, attempts have been continuously made to further enhance connectivity between devices, further optimize networks, promote software implementation of network entities, and increase the openness of wireless communication through design of new protocols to be used in 6G communication systems, development of mechanisms for implementation of hardware-based security environments and secure use of data, and development of technologies for privacy maintenance methods.

It is expected that such research and development of 6G communication systems will enable the next hyper-connected experience in new dimensions through the hyper-connectivity of 6G communication systems that covers both connections between things and connections between humans and things. Particularly, it is expected that services such as truly immersive extended reality (XR), high-fidelity mobile holograms, and digital replicas could be provided through 6G communication systems. In addition, with enhanced security and reliability, services such as remote surgery, industrial automation, and emergency response will be provided through 6G communication systems, and thus these services will be applied to various fields including industrial, medical, automobile, and home appliance fields.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a scheme for reducing a transmission delay of a random access preamble in a system operating many beams, for example, a wireless communication system using a frequency band of Tera Hz.

Another aspect of the disclosure is to provide a method, an apparatus, and a system for random access for reducing a random access preamble transmission delay and proposes a new preamble transmission structure and design for improving efficiency of a random access preamble.

Additional aspects will be set forth in part in the description which follows and, in part, will be apparent from the descriptions, or may be learned by practice of the presented embodiments.

In accordance with an aspect of the disclosure, a method performed by a terminal in a wireless communication system is provided. The method includes receiving, from a base station, a first signal including at least one reference signal, transmitting, to the base station, a second signal through a first uplink resource corresponding to a reference signal selected by measuring the at least one reference signal, and transmitting a random access preamble through a physical random access channel (PRACH) resource corresponding to the selected reference signal.

In accordance with another aspect of the disclosure, a method performed by a base station in a wireless communication system is provided. The method includes transmitting, to a terminal, a first signal including at least one reference signal, receiving, from the terminal, a second signal through a first uplink resource corresponding to a reference signal selected by the terminal, identifying a PRACH resource corresponding to the reference signal selected by the terminal, based on the second signal, and receiving, from the terminal, a random access preamble through the PRACH resource.

In accordance with another aspect of the disclosure, a terminal in a wireless communication system is provided. The terminal includes a transceiver and a controller configured to receive, from a base station via the transceiver, a first signal including at least one reference signal, transmit, to the base station via the transceiver, a second signal through a first uplink resource corresponding to a reference signal selected by measuring the at least one reference signal, and transmit, via the transceiver, a random access preamble through a PRACH resource corresponding to the selected reference signal.

In accordance with another aspect of the disclosure, a base station in a wireless communication system is provided. The base station includes a transceiver and a controller configured to transmit, to a terminal via the transceiver, a first signal including at least one reference signal, receive, from the terminal via the transceiver, a second signal through a first uplink resource corresponding to a reference signal selected by the terminal, identify a PRACH resource corresponding to the reference signal selected by the terminal, based on the second signal, and receive, from the terminal via the transceiver, a random access preamble through the PRACH resource.

According to various embodiments of the disclosure, a next-generation wireless communication system can provide a user equipment (UE) with PRACH resources so as to minimize a random access preamble delay of the UE, and does not configure PRACH resources in a beam direction in which the UE does not exist and removes wasted PRACH resources, so as to maximize resource efficiency.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 15 illustrates a random access preamble transmission procedure according to an embodiment of the disclosure;

Throughout the drawings, like reference numerals will be understood to refer to like parts, components, and structures.

DETAILED DESCRIPTION

Figure 1:
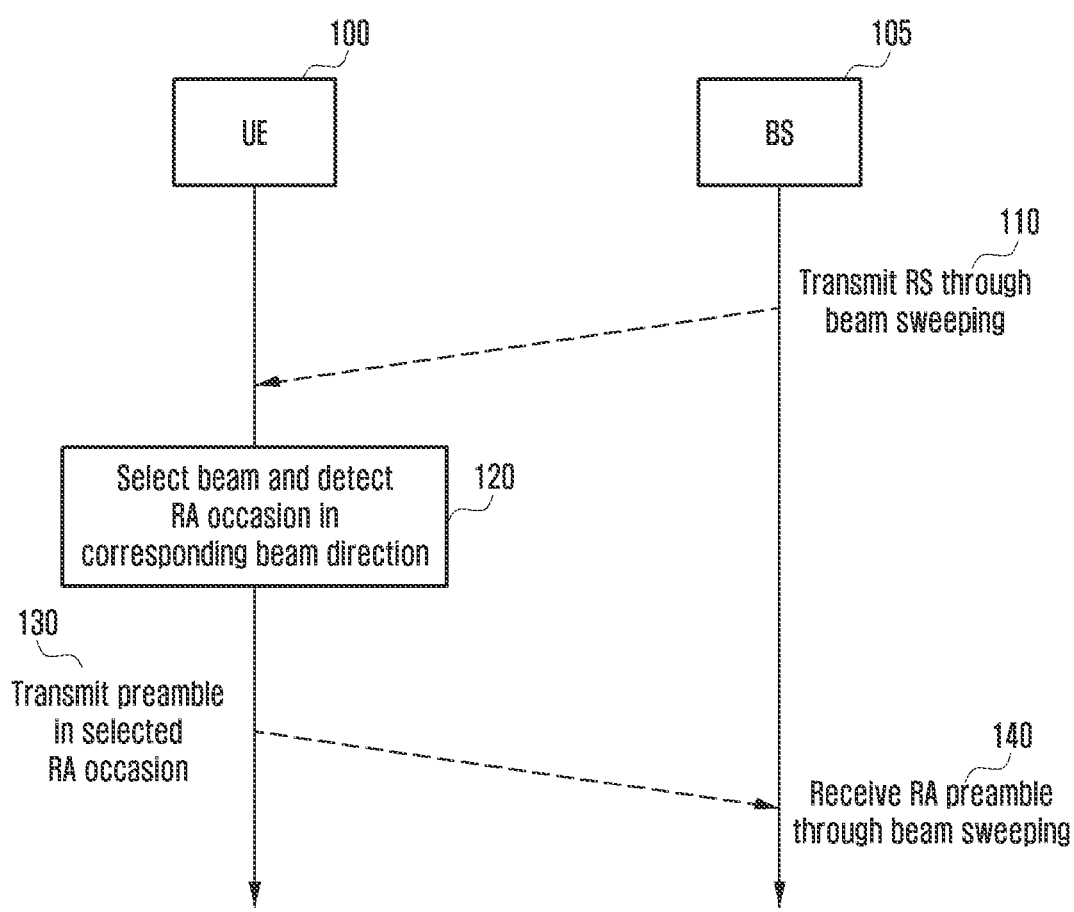
FIG. 1 illustrates a procedure for transmitting a random access preamble in a multi-beam-based system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more central processing units (CPUs) within a device or a security multimedia card. Further, the "unit" in the embodiments may include one or more processors.

The following detailed description of embodiments of the disclosure is directed to 6th generation (6G) mobile communication technology beyond the 5th generation (5G) mobile communication, but based on determinations by those skilled in the art, the main idea of the disclosure may be applied to other communication systems having similar technical backgrounds through some modifications without significantly departing from the scope of the disclosure.

In the following description, some of terms and names defined in the 3rd generation partnership project (3GPP) long term evolution (LTE) standards (standards for 5G, new radio (NR), LTE, or similar systems) may be used for the convenience of description. However, the disclosure is not limited by these terms and names, and may be applied in the same way to systems that conform other standards.

In the following description, terms referring to signals, terms referring to channels, terms referring to control information, terms referring to network entities, terms referring to device elements, and the like are illustratively used for the sake of convenience. Therefore, the disclosure is not limited by the terms as used herein, and other terms referring to subjects having equivalent technical meanings may be used.

In the following description, the terms "physical channel" and "signal" may be interchangeably used with "data" or "control signal". For example, "Physical Downlink Shared Channel (PDSCH)" is a term referring to a physical channel for transmitting data, but may be used to refer to data. That is, in the disclosure, the expression "transmit a physical channel" may be interpreted to be the same as the expression "transmit data or a signal through a physical channel".

In the disclosure, "higher-layer signaling" refers to a method of transmitting a signal from a BS to a UE through a downlink data channel of a physical layer or from a UE to a BS through an uplink data channel of a physical layer. Higher-layer signaling may be understood as Radio Resource Control (RRC) signaling or a Media Access Control (MAC) Control Element (CE).

Further, in the disclosure, the expressions "larger than" or "smaller than" may be used to indicate whether a specific condition is satisfied or fulfilled, but are used only to indicate examples, and do not exclude "larger than or equal to" or "equal to or smaller than" A condition indicating "larger than or equal to" may be replaced with "larger than", a condition indicating "equal to or smaller than" may be replaced with "smaller than", and a condition indicating "larger than or equal to and smaller than" may be replaced with "larger than and smaller than or equal to".

FIG. 1 illustrates a procedure for transmitting a random access preamble in a multi-beam-based system according to an embodiment of the disclosure.

Referring to FIG. 1, in 3GPP NR, a procedure for transmitting a random access preamble based on beamforming is described below.

A base station (BS) 105 transmits a reference signal (RS) through beam sweeping in operation 110. The reference signal may be, for example, a signal such as a synchronization signal block (SSB) or channel state information reference signal (CSI-RS), but is not limited thereto and may include various signals transmitted on the basis of beams. The beam may be an antenna configuration of the BS, an analog-oriented beam having directivity directing to physically different locations and having an output difference or a digital beam having logically different codes.

The user equipment (UE) 100 (alternatively referred to herein as a terminal) receives signals transmitted by the BS 105 for respective beams, and selects a BS beam suitable for exchange of information, for example, an optimal beam, a beam having the beset reception performance, or a beam having the best reception performance among beams having the performance higher than or equal to a specific threshold value in operation 120. Further, the UE 100 detects uplink random access (RA) occasion information corresponding to the selected beam direction on the basis of physical random access channel (PRACH) configuration information. At this time, the UE which has not yet accessed a cell may receive system information (SI) and detect PRACH configuration information, and the UE which has already accessed the cell may detect PRACH configuration information on the basis of pre-received PRACH configuration information.

The UE 100 transmits a random access preamble through corresponding resources on the basis of detected RA occasion information in operation 130.

The BS 105 receives a random access preamble while performing beam sweeping on one or more preconfigured PRACHs, for example, PRACHs configured in all BS beam directions in operation 140.

Figure 2:
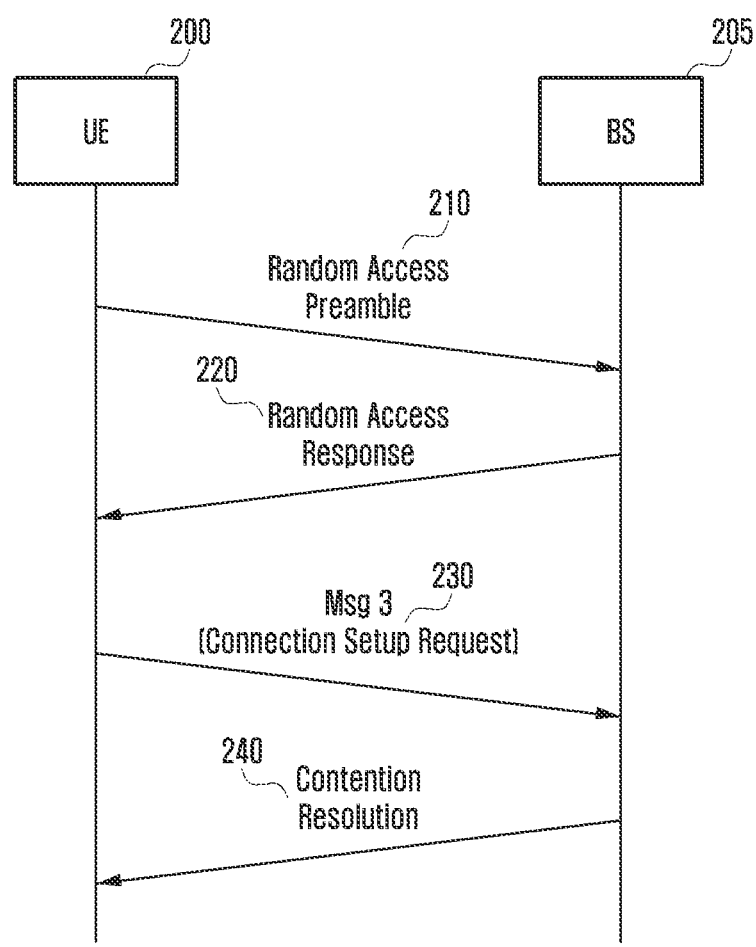
FIG. 2 illustrates a random access procedure in a wireless communication system according to an embodiment of the disclosure.

FIG. 2 illustrates a random access procedure in a wireless communication system according to an embodiment of the disclosure.

Referring to FIG. 2, a UE 200 may transmit a random access preamble to a BS 205 and the BS may receive the random access preamble while performing beam sweeping in operation 210, as described in FIG. 1.

The BS 205 may transmit a random access response corresponding to the received random access preamble to the UE 200 in operation 220. At this time, the random access response may include allocation information of uplink resources through which the UE 200 receiving the random access response can transmit message (Msg) 3 and a temporary UE (identifier) ID (temporary C-RNTI) to be used at that time.

The UE 200 receiving the random access response may identify the uplink resource allocation information and the temporary UE ID and transmit Msg 3 through the corresponding resources in operation 230. At this time, the UE to perform an initial access procedure may also transmit a connection setup request message included in the Msg 3.

The BS 205 receiving Msg 3 from the UE 200 may transmit a contention resolution message to UEs successfully receiving Msg 3 in operation 240 to inform of successful completion of random access. The contention resolution message may include a connection setup message from the BS.

Although not illustrated, the UE 200 may transmit a connection setup compete message to the BS 205 to complete the connection setup. When the connection setup is completed, the UE may acquire a formal UE ID (C-RNTI) to be used within the BS and accordingly transmit and receive all control signals to and from the BS.

Figure 3:
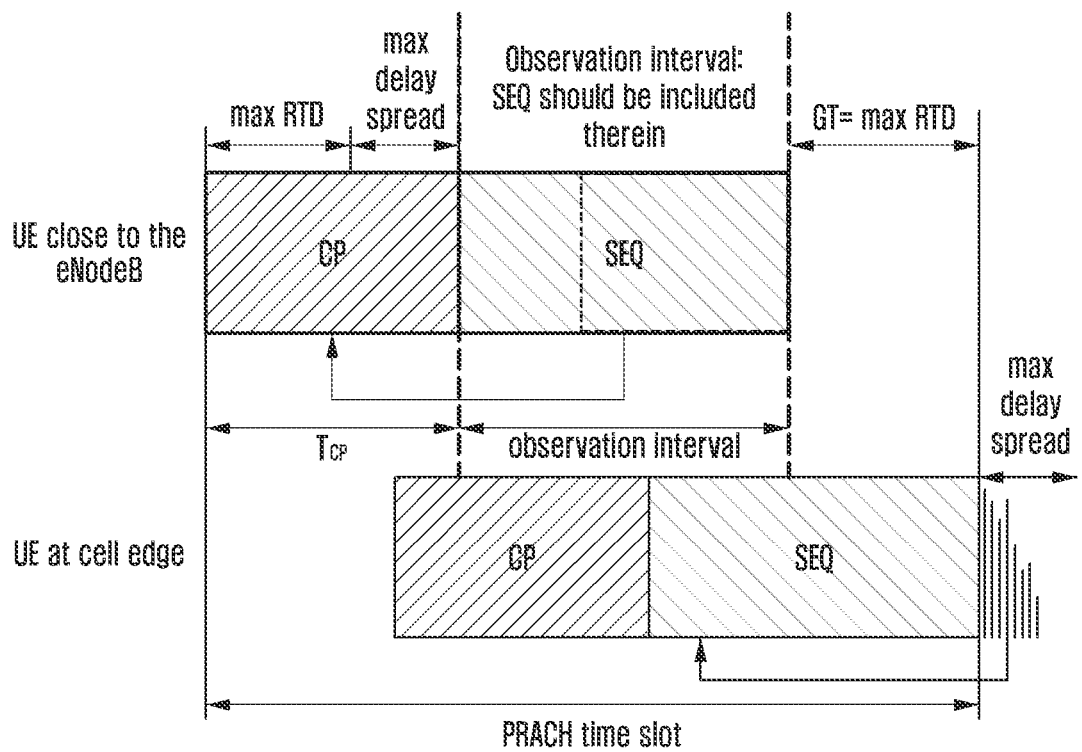
FIG. 3 illustrates a random access preamble format according to an embodiment of the disclosure.

FIG. 3 illustrates a random access preamble format according to an embodiment of the disclosure.

Referring to FIG. 3, in 3GPP, LTE, and NR of the related art, the random access preamble may have various formats and various lengths.

The random access preamble (hereinafter, referred to as a preamble) is transmitted while having a cyclic prefix (CP) having a predetermined length or longer in a frame to prevent signals transmitted by different UEs from overlapping or having empty within coverage and cyclic-shifting a preamble sequence (SEQ). After the CP, one SEQ may be disposed or the SEQ may be duplicated and one or more SEQs may be disposed.

The preamble may have a guard time (GT) in order to protect information transmitted and received continuously from inter-symbol interference.

Figure 4A:
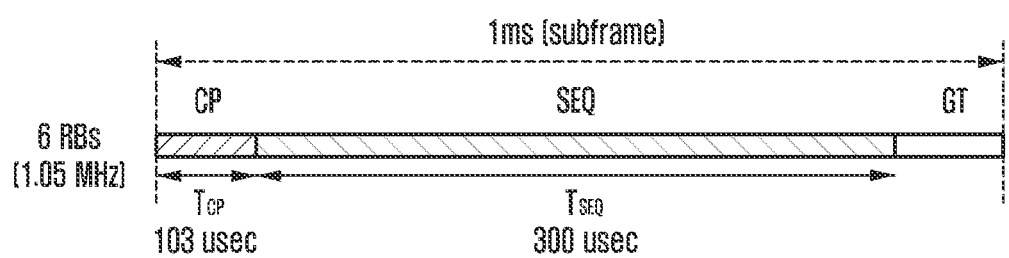
FIG. 4A illustrates an example of a random access preamble format in a long-term evolution (LTE) system according to an embodiment of the disclosure.
Figure 4B:
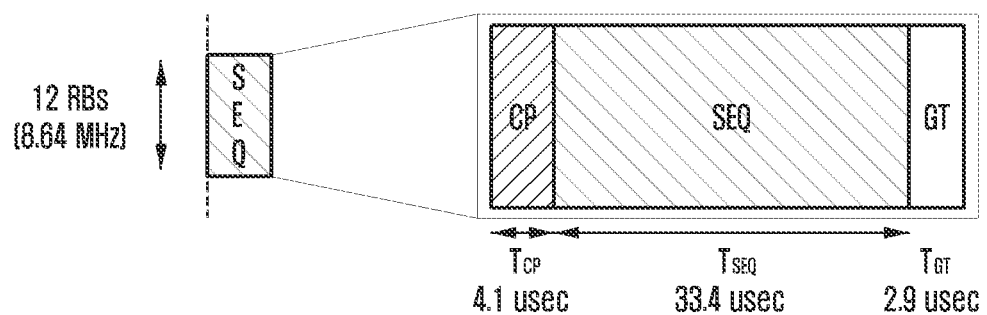
FIG. 4B illustrates an example of a random access preamble format in a new radio (NR) system according to an embodiment of the disclosure.
Figure 4C:
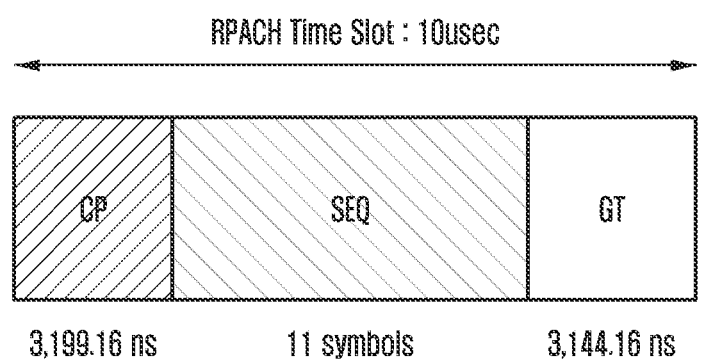
FIG. 4C illustrates an example of a random access preamble format available in a Tera Hz frequency band according to an embodiment of the disclosure.

FIG. 4A illustrates an example of a random access preamble format in a wireless communication system according to an embodiment of the disclosure, FIG. 4B illustrates an example of a random access preamble format in a wireless communication system according to an embodiment of the disclosure, and FIG. 4C illustrates an example of a random access preamble format in a wireless communication system according to an embodiment of the disclosure.

Referring to FIG. 4A, it illustrates an example of a random access preamble format in an LTE system.

The preamble format illustrated in the FIG. 4A corresponds to format 0 which is used in an LTE 900 MHz frequency band. The corresponding format has the following characteristics.

Cell Radius=14 km
ZC sequence length=839
SCS ($\Delta f$)=15 kHz
RA SCS($\Delta f_{RA}$)=1.25 kHz Referring to FIG. 4B, it illustrates an example of a random access preamble format in an NR system.

The preamble format illustrated in the FIG. 4B corresponds to format B4 which is used in an NR 28 GHz frequency band. The corresponding format has the following characteristics.

Cell Radius=500 m
ZC sequence length=139
SCS ($\Delta f$)=60 kHz
RA SCS($\Delta f_{RA}$)=60 kHz
# of Beams=64

The length of the general preamble used in NR frequency range 2 (FR2) which is a frequency band higher than or equal to 6 GHz may be from 2-data-symbol length to 12-data-symbol length. In the frequency band, the NR preamble fixedly occupies 12 radio blocks (RBs).

Referring to FIG. 4C, it illustrates an example of a random access preamble format available in a Tera Hz frequency band.

A wireless communication system using the Tera Hz frequency band has a significantly lower data symbol length and the RB size having a significantly larger frequency bandwidth than the current wireless communication system due to a frequency characteristic and a channel characteristic. For example, a wireless communication system using a frequency band of 140 GHz may have the data symbol size of 333 nsec length and RBs having the size of 40 MHz.

The wireless communication system using the Tera Hz frequency band having very short RBs in an aspect of the time and very long RBs in an aspect of the frequency has considerably much data which can be transmitted in the unit time compared to the existing system.

When a random access preamble which can be used in the Tera Hz frequency band is designed, a CP and a GT may be determined in consideration of a maximum round trip delay (RTD) and a maximum delay spread according to a cell radius. Further, the sequence length may be determined in consideration that the sequence length should be larger than or equal to the CP and should be an integer multiple of a data symbol. Random access preambles used in the Tera Hz frequency band may be designed in consideration of such factors as illustrated in FIG. 4C.

A preamble transmission PRACH time slot structure having the size of 10 usec in the Tera Hz band is shorter than the length of the currently used preamble in NR of an mmWave band. However, in comparison with a relative length of a data symbol, the preamble in the Tera Hz band is 30 times larger than data and is relatively larger than the preamble used in the mmWave band that is 2 times to 12 times larger than that.

Further, in the Tera Hz band, in order to compensate for signal attenuation due to a frequency increase, a beam having a higher antenna gain and a narrower beam width than the mmWave band system should be used. For example, the number of beams which should be used to satisfy the same coverage in a three-dimensional environment becomes 4 times in spite of a half of the beam width.

Accordingly, due to the larger number of beams compared to NR, the preamble in the Tera Hz band has a severe delay problem. For example, when a system of a frequency band of 140 GHz uses 256 beams that are 4 times larger than NR, the BS does not know when an unspecified UE (For example, a UE which is not in a connected state and performs random access for the connection or a UE which is in a connected state but satisfies a specific condition and thus performs random access) transmits a random access preamble and which beam direction is used by the UE, and thus PRACH resources should be allocated for all beams which can be received by the BS. That is, the BS should periodically and repeatedly allocate PRACH resources corresponding to the number of all beams. For example, when one PRACH resource needs one slot, 10 usec, a total of 256 slots, that is, a time of 2.56 msec is needed. When PRACH resources overlap frequency resources, a time occupied by the PRACH resources for all beams may be reduced by additionally using frequency resources instead of time resources.

The BS should periodically allocate PRACH resources, and the UE should wait for a period to transmit and retransmit a random access preamble in a specific beam direction. In other words, a period on which PRACH resources are allocated may be a random access delay of the UE. In order to improve the random access performance of the UE, it is better to reduce the PRACH resource allocation period, but overhead occupying resources also increases as the period becomes shorter.

For example, when a frequency bandwidth occupied by PRACH resources is about ⅓ of a total bandwidth (400 MHz among a bandwidth of 1.2 GHz), overhead of resources occupied according to the period when PRACH resources are allocated in 256 beam directions is as shown in the following Table 1.

TABLE 1

| Periodicity | 20 ms | 40 ms | 80 ms | 160 ms | 320 ms |
| --- | --- | --- | --- | --- | --- |
| PRACH Overhead | 4.3% | 2.1% | 1.12% | 0.5% | 0.3% |

In order to reduce resource occupation overhead, PRACH resources having a long period should be allocated, and thus the UE unavoidably experiences a long delay in random access attempt or reattempt.

Figure 5:
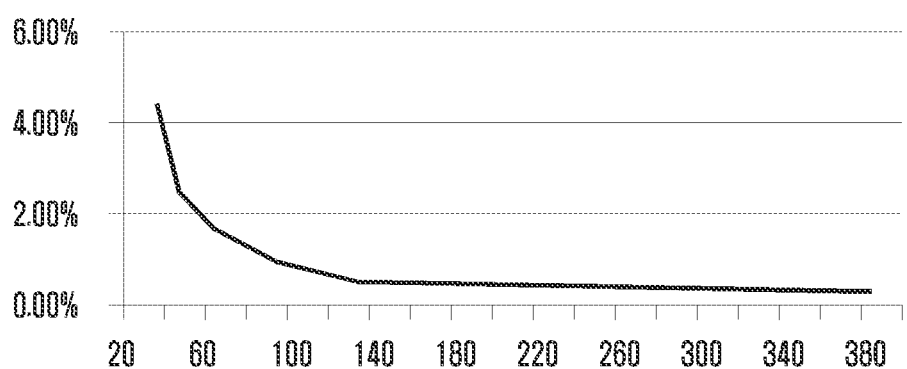
FIG. 5 illustrates overhead of physical random access channel (PRACH) resources according to a period in a multi-beam-based system according to an embodiment of the disclosure.

FIG. 5 is a graph showing resource overhead decreasing according to an increase in a PRACH configuration period (latency) according to an embodiment of the disclosure.

Referring to FIG. 5, the tradeoff relation is established between the PRACH delay and resource overhead. In other words, in order to reduce the delay, overhead should be endured. On the other hand, in order to reduce overhead, the delay should be endured.

In the LTE system using a single beam in a low frequency, there are an allocation period of 10 ms and resource overhead of about 0.5% in the case of the PRACH. However, in a future system using many beams in a high frequency, when the PRACH is configured and used, there may be a disadvantage of giving up one of the delay and the resource overhead on the basis of the tradeoff relation therebetween.

Further, PRACH resources allocated in all BS beam directions are beam-swept every time and mostly wasted when preambles are received from unspecified UEs. For example, in a super high frequency system operating 256 BS beams, a probability of the existence of UEs which are required to perform random access in 200 or more beam directions in every period is very low. In order to offset a signal attenuation due to a frequency in a super high frequency, the system using the many beams has necessarily limited coverage, and accordingly, has a small cell. A probability obtained by multiplying a probability of the existence of the UE in one BS beam direction in a small cell and a probability of a need of random access by the existing UE may be very low.

Most of the PRACH resources which are frequently allocated but are not used may be thrown away and wasted, which causes much waste of capacities in a wireless communication system having a very high data rate per unit resource. Also, the BS should be frequently and unnecessarily change a beam and accordingly, waste of power consumption cannot be ignored of course.

Figure 6:
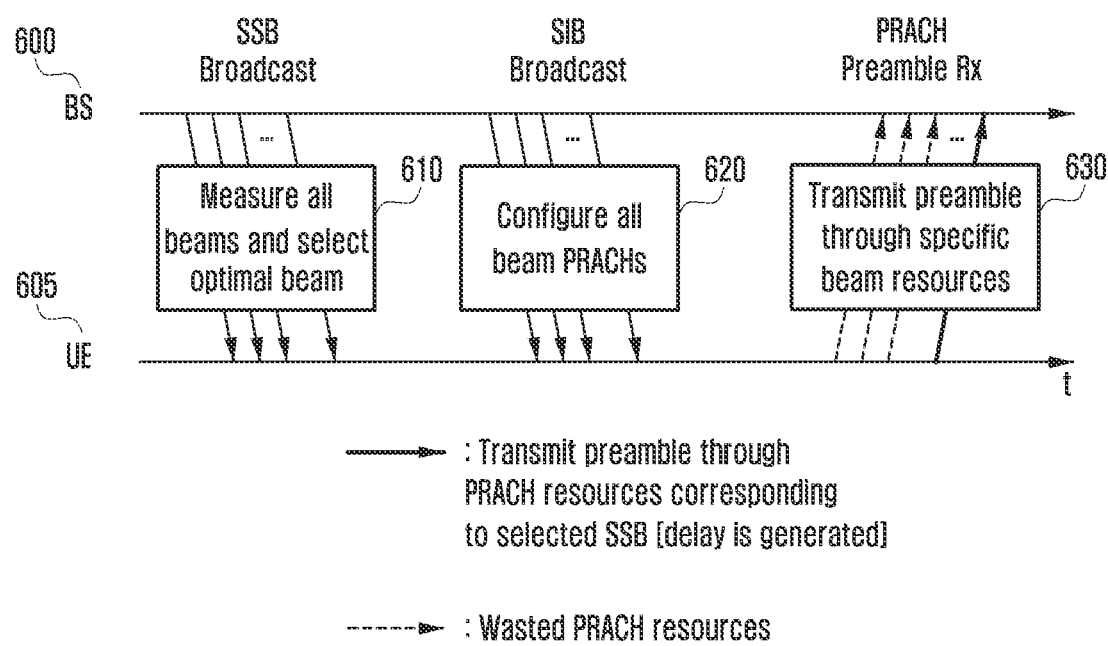
FIG. 6 illustrates a procedure for transmitting a random access preamble in a multi-beam wireless communication system according to an embodiment of the disclosure.

FIG. 6 illustrates a procedure for transmitting a random access preamble in a multi-beam wireless communication system according to an embodiment of the disclosure.

FIG. 6 describes the existing NR random access preamble transmission procedure using multiple beams and disadvantages of the transmission procedure.

Referring to FIG. 6, in operation 610, a BS 600 transmits an SSB in all beam direction operated, and a UE 605 changes its own beam, receives SSBs of the BS, and selects an optimal BS SSB.

Thereafter, in operation 620, the BS 600 does not know which UE transmits a random access preamble, when the UE transmits the random access preamble, and which beam is used for transmitting the random access preamble within the coverage area, and thus allocates PRACH resources in all beam direction operated, insert PRACH resource configuration information into system information (SI), and transmit the SIB (system information block) in all beam directions.

In operation 630, the UE 605 receives the SIB in the selected BS beam direction, identifies PRACH resource allocation information included in the corresponding SIB, and transmits the random access preamble through the PRACH resources configured in the selected BS beam direction.

At this time, when the PRACH resources configured in the corresponding beam direction are located temporally in the back, for example, back of hundreds of msec, the UE cannot help experiencing a long time delay until transmitting the random access preamble. Further, so many PRACH resources which do not actually transmit the random access preamble are empty and wasted.

In the NR system of the related art has a problem of unavoidably transmitting a preamble sequence due to long sequence timing even though there is sufficient transmission power.

In a future 6G system, an actually required preamble sequence length is reduced due to high transmission power and short coverage, but a preamble sequence longer than the CP should be transmitted due to uplink timing.

In LTE and NR of the related art, the preamble sequence length is significantly longer than the cyclic prefix length in order to support coverage of a cell. For example, in LTE, the CP is 100 usec and the preamble sequence is 800 usec, and thus preamble sequence is 8 times longer than the CP. In NR, the preamble sequence length is various, that is about 2 to 8 times longer than the CP.

However, the sequence length required to support the cell coverage may become significantly shorter than the cyclic prefix in consideration of increasing UE transmission power and the smaller cell size in a 6G wireless communication environment.

For example, in the case of a 6G wireless communication network having a radius of 500 m, transmission power of 50 dBm, and a frequency of 140 GHz, a CP having the length of 3.2 usec may be needed, but 1.67 usec of the Zadoff-Chu sequence length is sufficient. The Zadoff-Chu requirement sequence length considering the path loss and coverage due to the transmission power and frequency may be obtained by Equation 1 below.

$$\frac{T_{SEQ} \cdot P_{RX}(r)}{N_0 N_f} = \frac{T_{SEQ} \cdot (P_{Max} + Gain_{Antenna} - Loss_{Feedline, Radome} - Margin_{Implement} - PL(r))}{N_0 N_f} \geq \frac{E_{SEQ}}{N_0}$$

T_SEQ denotes a time length of a Zadoff-Chu sequence, P_RX(r) denotes received signal power corresponding to coverage r, $N_o$ denotes noise power per frequency (−174 dBm/Hz), $N_f$ denotes a noise floor, P_Max denotes maximum transmission power, Gain_Antenna denotes a transmission/reception antenna performance gain, Loss_(Feedline, Radome) denotes feeder line and radome loss, Margin_implement denotes an implemented performance loss margin, and PL(r) denotes path loss according to coverage r. E_SEQ denotes energy of total Zadoff-Chu sequence transmitted, and E_SEQ/$N_o$ denotes Zadoff-Chu sequence energy per noise, and if it is generally 17 dB in a typical urban 6-ray channel model, a false alarm probability may achieve 1% and a missed detection probability may achieve 1%. When E_SEQ/$N_o$ is 18 dB, a false alarm probability may achieve 0.1% and a missed detection probability may achieve 1%.

Figure 7:
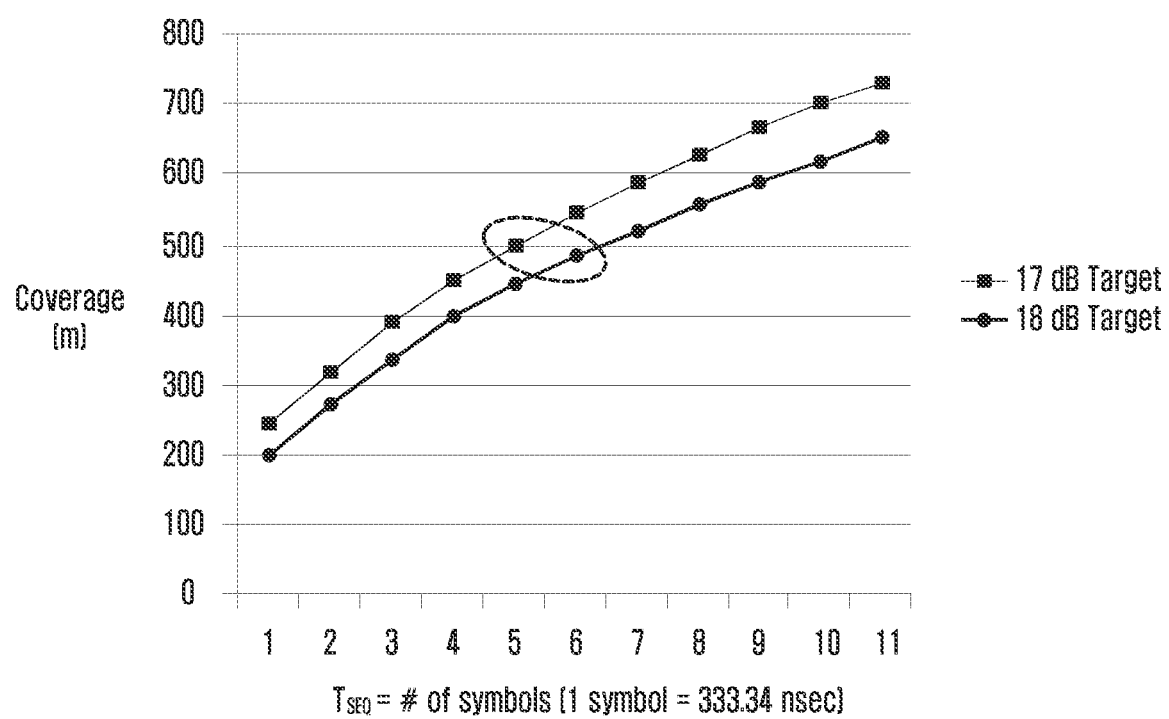
FIG. 7 illustrates the length of a required Zadoff-Chu sequence according to each coverage and Zadoff-Chu sequence detection performance according to an embodiment of the disclosure.

FIG. 7 is a graph illustrating the required Zadoff-Chu sequence length according to the coverage and the Zadoff-Chu sequence detection performance in the configuration of the 6G system according to an embodiment of the disclosure.

Referring to FIG. 7, the required preamble sequence length in consideration of the coverage of 500 m is about 1.67 usec and thus is very short. However, the CP length required to support the coverage of 500 m is about 3.2 usec in consideration of a maximum round-trip delay (RTD) and a maximum delay spread.

Further, the random access preamble is used to control required timing in order to make uplink transmission of the UE received by the BS on an accurate slot boundary. To this end, a difference between delay signals transmitted by UEs and an actual received signal slot boundary of the BS may be measured using "zero for an auto-correlation with itself cyclic shifted" that is one of features of the Zadoff-Chu sequence of the random access preamble and a timing adjust (TA) operation for adjusting timing is performed by allowing the UE to start transmission earlier by RTD/2 on the basis of an RTD corresponding to the difference.

To this end, the preamble sequence length and the BS observation period corresponding thereto should be larger than or equal to the CP.

Figure 8A:
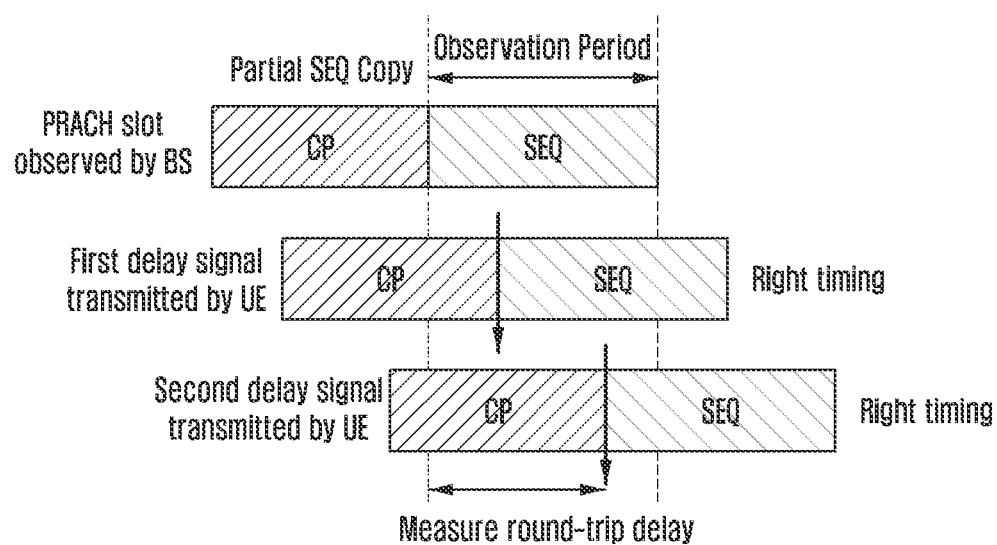
FIG. 8A illustrates an example of a random access preamble format suitable for a 6th generation (6G) system according to an embodiment of the disclosure.
Figure 8B:
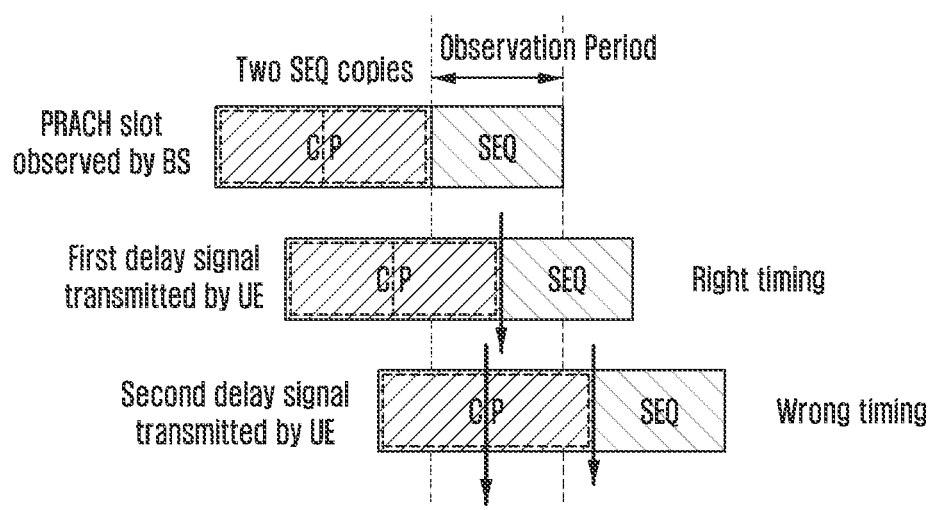
FIG. 8B illustrates an example of a random access preamble format suitable for a 6G system according to an embodiment of the disclosure.

FIGS. 8A and 8B illustrate an example of a random access preamble format suitable for a 6G system according to various embodiments of the disclosure.

For example, FIG. 8A illustrates the case in which the preamble sequence length is larger than or equal to the CP.

Referring to FIG. 8A, the BS may accurately measure a sequence peak within the observation period in not only the case of a first delay signal transmitted by the UE located relatively close to the BS but also the case of a second delay signal transmitted by the UE spaced apart from the BS and also measure an accurate round trip delay.

However, if the preamble sequence length is smaller than the CP, it is difficult to measure the accurate RTD.

Referring to FIG. 8B, when the preamble sequence length is smaller than about a half of the CP, the BS may identify a copied sequence peak within the CP for the second delay signal transmitted by the UE spaced apart from the BS and has a value different from the RTD which should be actually measured, and thus timing adjustment is not possible.

Figure 8C:
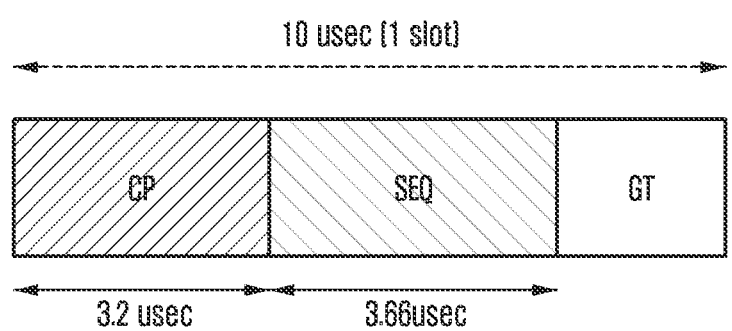
FIG. 8C illustrates an example of a random access preamble format suitable for a 6G system according to an embodiment of the disclosure.

FIG. 8C illustrates an example of a random access preamble format suitable for a 6G system according to an embodiment of the disclosure.

Referring to FIG. 8C, when a random access preamble suitable for the 60 Tera Hz system is configured in consideration of the CP length, the guard time, the coverage, and the timing, for example, a shape may be used. Here, the preamble sequence length should be longer than the CP and should be a multiple of the data symbol, the preamble sequence length may be determined as 3.66 usec, which is two times or more larger than the preamble sequence length 1.67 usec actually required for the coverage.

The designed preamble slot structure and length influence the delay and overhead according to the above-discussed PRACH transmission period and also influence an amount of wasted resources due to a configuration in a beam direction in which the UE does not exist.

However, it is apparent that the CP or preamble sequence length cannot be further reduced in consideration of the coverage and the timing, and thus approach to another method is needed.

Various embodiments of the disclosure propose a new channel, a signal structure, and a protocol for efficiently reducing the delay and allocating resources in consideration of the preamble slot structure.

Figure 9:
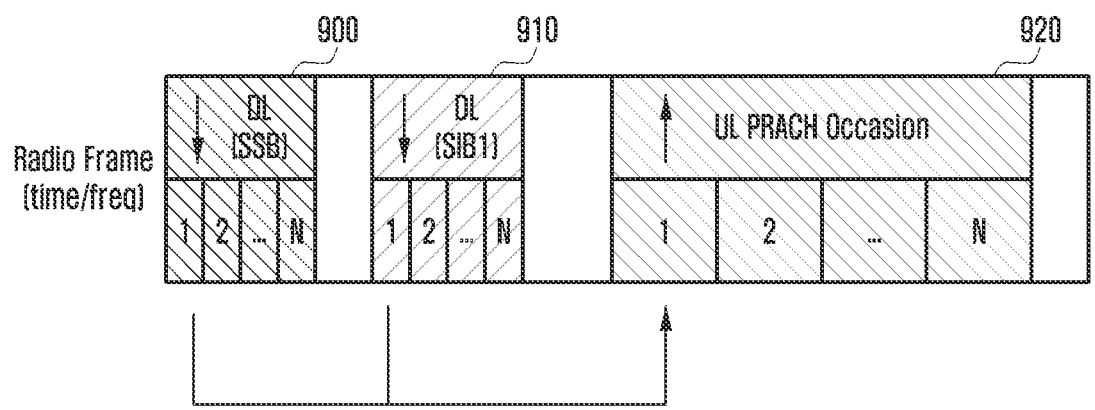
FIG. 9 illustrates a procedure for transmitting a random access preamble in an NR communication system according to an embodiment of the disclosure.

FIG. 9 illustrates a procedure for transmitting a random access preamble in an NR communication system according to an embodiment of the disclosure.

Referring to FIG. 9, in the NR system of the related art, the BS transmits an SSB through beam sweeping in operation 900, allocate RACH resources in all beam directions and informs the UE of the allocation through broadcasting in operation 910, and the UE identifies RACH resources corresponding to the selected beam and performs the RACH using the same in operation 920.

However, due to the too many beams and relatively long PRACH resources, the random access delay and overhead may be generated.

Figure 10:
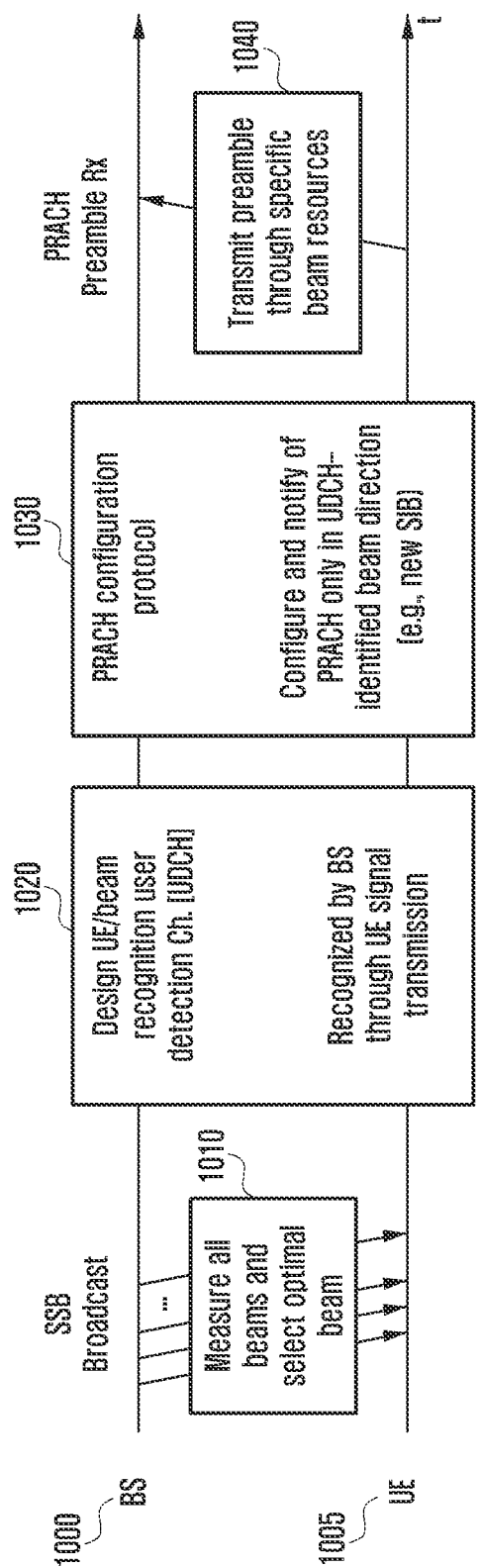
FIG. 10 illustrates a random access preamble transmission procedure according to an embodiment of the disclosure.

FIG. 10 illustrates a random access preamble transmission procedure according to an embodiment of the disclosure.

Referring to FIG. 10, the random access procedure according to various embodiments of the disclosure detects a BS beam making transmission and reception to and from the UE possible, for example, a BS beam corresponding to the UE location and then configures PRACH resources. In the system of the related art, a beam through which communication with the terminal is possible cannot be determined by the BS, and thus PRACH resources are unavoidably configured in all BS beam directions by the BS. However, in the system according to an embodiment of the disclosure, a beam direction in which the UE exists may be first detected by the BS, PRACH resources corresponding to the beam direction in which the UE exists may be configured, and thus it is possible to minimize a random access preamble delay of the UE by providing PRACH resources required for the UE and maximize resource efficiency by removing wasted PRACH resources. According to a method by which the BS recognizes the existence of the UE in a specific beam direction according to an embodiment of the disclosure, the UE may transmit a short signal to the BS through, for example, a user detection channel (UDCH) (or UE detection channel) and the BS may receive the corresponding signal and detect the existence of the UE. At this time, the name of the user detection channel is only an example, and may include all channels used by the UE to inform the BS of the existence.

According to an embodiment of the disclosure, in operation 1010, the BS 1000 may transmit an SSB in all beam directions operated, and the UE 1005 may receive SSBs of the BS while changing its own beam and select an optimal BS SSB.

In operation 1020, the UE 1005 may transmit an uplink signal through the UDCH, and the BS 1000 may receive the corresponding signal and identify that the UE exists in a specific beam direction.

In operation 1030, the BS 1000 may allocate PRACH resources in a specific beam direction(s) corresponding to the BS beam direction estimated to make communication with the UE 1005 possible and inform UE(s) of allocated PRACH resource information. At this time, a new system information block, for example, SIB-α may be defined by a new protocol configuring the information.

In operation 1040, the UE 1005 may transmit a random access preamble to the BS 1000 on the basis of the received PRACH resource information, and the BS 1000 may receive the random access preamble on the basis of PRACH resource information.

Figure 11:
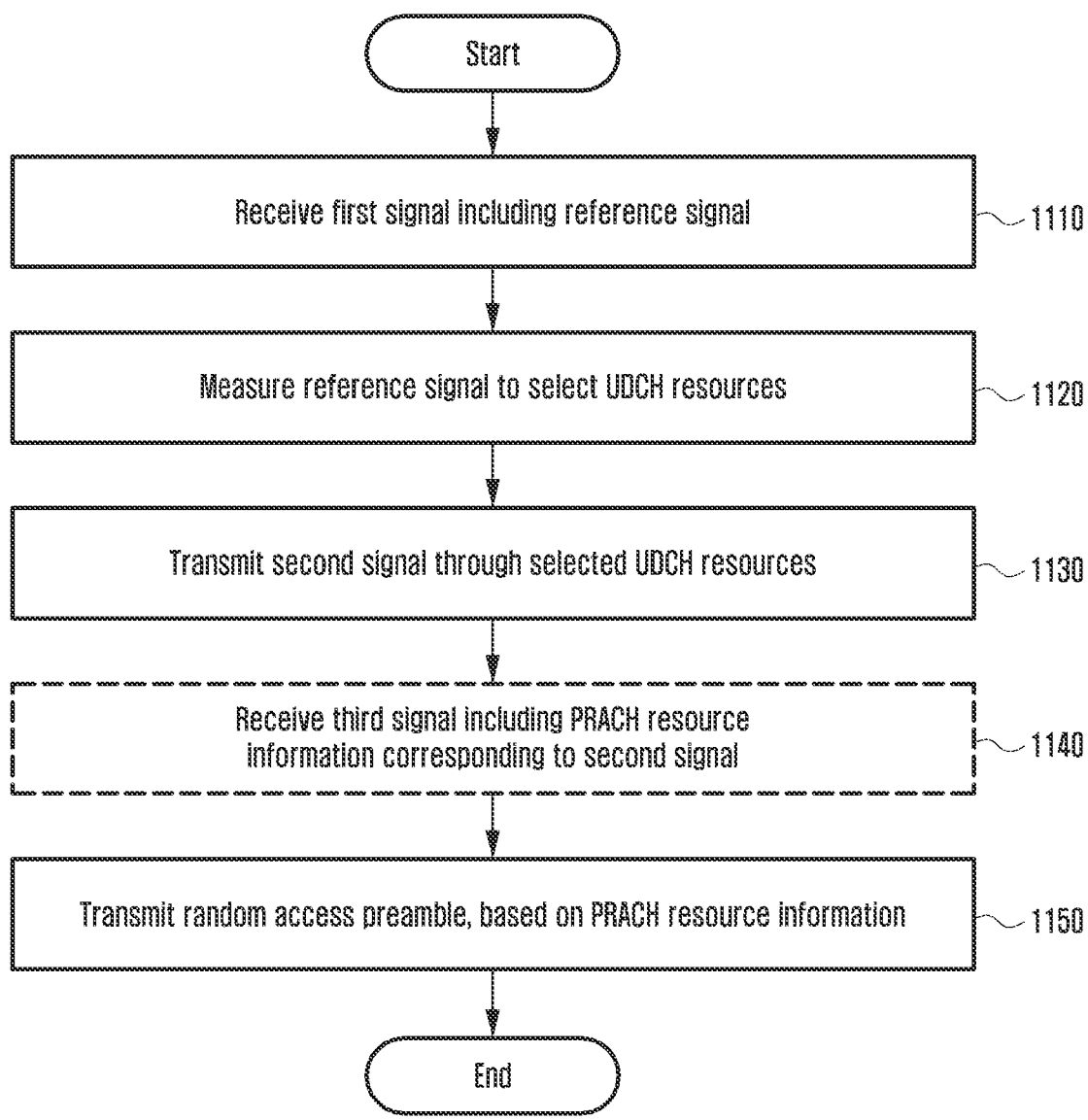
FIG. 11 is a flowchart illustrating a random access preamble transmission procedure of a user equipment (UE) according to an embodiment of the disclosure.

FIG. 11 is a flowchart illustrating a random access preamble transmission procedure of a UE (for example, the UE 1005) according to an embodiment of the disclosure.

Referring to FIG. 11, in operation 1110, the UE may receive a first signal including a reference signal transmitted by the BS. The BS may transmit the first signal through beam sweeping. Each reference signal transmitted through sweeping may correspond to each beam.

The reference signal may be a synchronization signal (SS) such as a synchronization signal block (SSB) or a signal such as a channel state information reference signal (CSI-RS). The reference signal is not limited thereto, and may include various signals transmitted on the basis of a beam.

The first signal may or may not include a broadcast signal (for example, a master information block (MIB) or a system information block (SIB)). When the first signal does not include the broadcast signal, the BS may transmit the broadcast signal to the UE through separate signaling.

The broadcast signal may include, for example, at least one of downlink resource information for transmitting SIB-α and UDCH uplink resource information.

The SIB-α may be, for example, a signal including PRACH resource information according to an embodiment of the disclosure. SIB-α resource information is resources expressed by the frequency and time, and a reference signal (beam) has a correlation (for example, quasi co location (QCL) relation) with each resource may be configured. The corresponding resources may be always allocated fixedly, and when variable allocation is needed, for example, when an uplink signal is received/detected through a UDCH having the QCL relation with any reference signal, only a downlink channel having the QCL relation with the corresponding reference signal may be allocated. An indicator indicating determination of the allocation may be also included in the broadcast signal.

The UDCH may be a channel for transmitting a signal from the UE to the BS in order to identify a BS beam through which the BS can communicate with the UE according to an embodiment of the disclosure. UDCH resource information is resources expressed by the frequency band time, and a reference signal (beam) has a correlation (for example, QCL relation) with each resource may be directly configured.

Alternatively, indirectly, information on a plurality of channel resources configured in the standard and an ID indicating a reference signal (beam) having the correlation with each resource may be transmitted and configured through the broadcast signal. For example, the broadcast signal may include PRACH resource information for each beam according to an embodiment.

The UE may detect UDCH resource information for transmitting an uplink signal through the received broadcast signal, measure a reference signal, and select UDCH resources corresponding to the selected reference signal (Beam) in operation 1120. The UE may select a reference signal having the best performance (RSSI, RSRP, RSRP, or CQI) while changing its own reception antenna configuration (switching a beam direction) or select a reference signal larger than a specific threshold value. Also, a reference signal corresponding to an optimal beam may be selected through various methods.

The UE may transmit a second signal (for example, user detection signal) through UDCH resources having the correlation (for example, QCL) with the determined reference signal (beam) to the BS in operation 1130. The second signal may be used to identify a reference signal having the correlation with the corresponding UDCH through reception or detection of the second signal by the BS. That is, the BS may detect a reference signal (beam) corresponding to a beam direction of the BS estimated to make communication with the UE possible through reception of the second signal.

The UE may receive a third signal including PRACH resource information through the SIB-α resources in operation 1140. The third signal may have a newly defined SIB-α protocol. The PRACH resource information may include resource configuration information related to the reference signal (beam) corresponding to the beam direction of the BS estimated to make communication with the UE possible, detected on the basis of the second signal received through the UDCH. The PRACH resource information may include resource information expressed by the frequency and time or may indicate some or all of the PRACH resources configured through the broadcast signal in a bit map format.

Meanwhile, according to an embodiment of the disclosure, the UE may not receive the third signal. In this case, the UE may identify resource information corresponding to the reference signal (beam) determined in the PRACH resource information (resource information configuration for each beam) received through the broadcast signal. That is, the UE informing the BS of the beam direction of the BS estimated to make communication with the UE possible through the UDCH may detect PRACH resources associated with the BS beam corresponding to the UDCH without additional signaling reception.

The UE may transmit a random access preamble through the detected PRACH resources to the BS in operation 1150. The UE may start a random access procedure by transmitting to the BS the random access preamble through PRACH resources having the QCL relation with the reference signal (beam).

Figure 12:
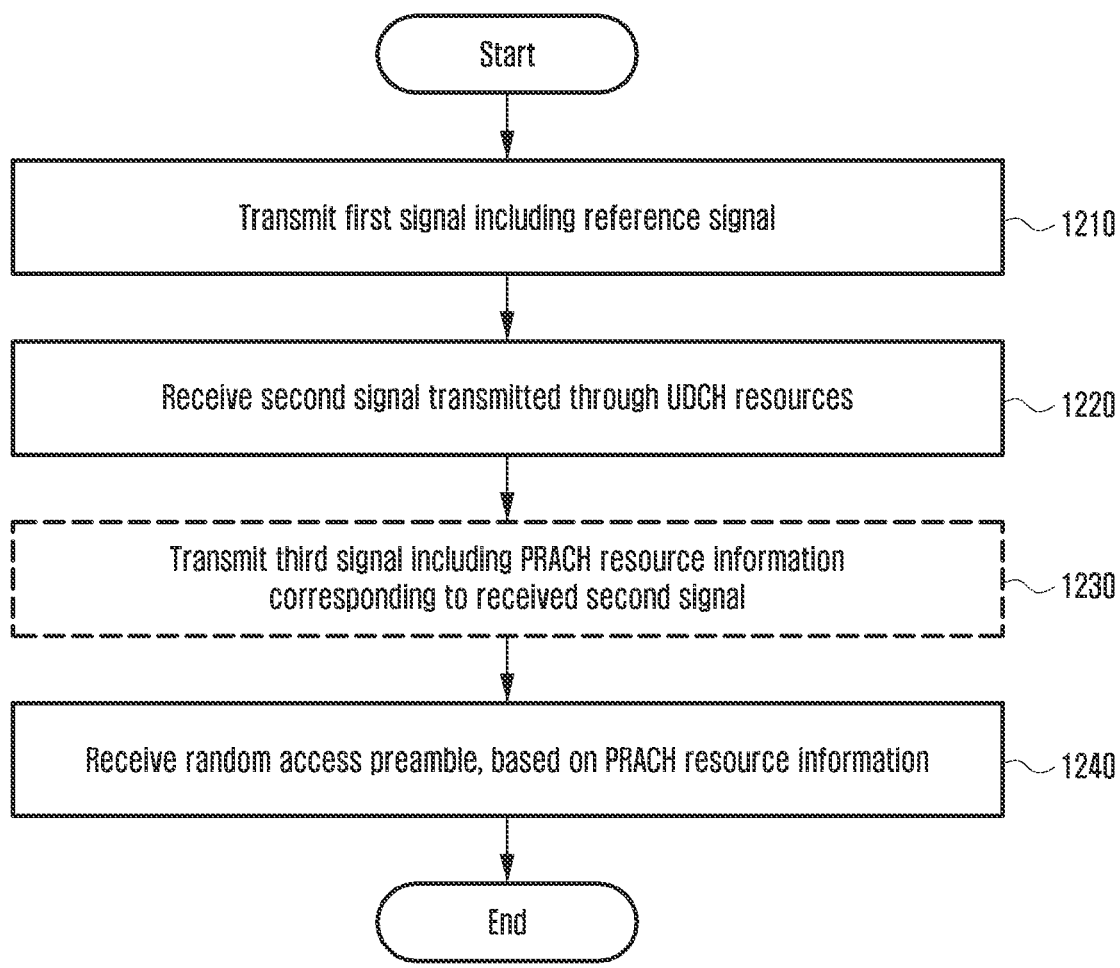
FIG. 12 is a flowchart illustrating a random access preamble transmission procedure of a base station (BS) according to an embodiment of the disclosure.

FIG. 12 is a flowchart illustrating a random access preamble reception procedure of a BS (for example, the BS 1000) according to an embodiment of the disclosure.

Referring to FIG. 12, in operation 1210, the BS may periodically transmit a first signal including a reference signal. The BS transmits the first signal through beam sweeping. Each reference signal transmitted through sweeping may correspond to each beam.

The reference signal may be a synchronization signal (SS) such as a synchronization signal block (SSB) or a signal such as a channel state information reference signal (CSI-RS). The reference signal is not limited thereto, and may include various signals transmitted on the basis of a beam.

The first signal may or may not include a broadcast signal (for example, a MIB or a SIB). When the first signal does not include the broadcast signal, the BS may transmit the broadcast signal to the UE through separate signaling (e.g., SIB).

The broadcast signal may include, for example, at least one of SIB-α resource information and UDCH resource information.

The SIB-α may be, for example, a signal including PRACH resource information according to an embodiment of the disclosure. SIB-α resource information is resources expressed by the frequency and time, and a reference signal (beam) having the correlation (for example, QCL relation) with each resource may be configured. The corresponding resources may be always allocated fixedly, and when variable allocation is needed, for example, when an uplink signal is received/detected through a UDCH having the QCL relation with any reference signal, only a downlink channel having the QCL relation with the corresponding reference signal may be allocated. An indicator indicating determination of the allocation may be also included in the broadcast signal.

The UDCH may be a channel for transmitting a signal from the UE to the BS in order to identify a BS beam direction estimated to make communication with the UE possible by the BS according to an embodiment of the disclosure. UDCH resource information is resources expressed by the frequency band time, and a reference signal (beam) has a correlation (for example, QCL relation) with each resource may be directly configured.

Alternatively, indirectly, information on a plurality of channel resources configured in the standard and an ID indicating a reference signal (beam) having the correlation with each resource may be transmitted and configured through the broadcast signal. For example, the broadcast signal may include PRACH resource information for each beam according to an embodiment.

In operation 1220, the BS may receive/detect a second signal (for example, user detection signal) in the uplink through the configured UDCH. The second signal may be used to identify a reference signal having the QCL relation with the corresponding UDCH. That is, the BS may detect a reference signal (beam) corresponding to the UE location, in other words, the BS beam direction estimated to make communication with the UE possible, through reception of the second signal.

In operation 1230, the BS may transmit a third signal including PRACH resource information corresponding to (having the QCL relation with) the detected reference signal (beam) through the SIB-α resources.

The third signal may have a newly defined SIB-α protocol. The PRACH resource information may include resource configuration information related to the reference signal (e.g., beam) corresponding to the BS beam direction estimated to make communication with the UE possible, corresponding to the UE location detected on the basis of the second signal received through the UDCH. The PRACH resource information may include resource information expressed by the frequency and time or may indicate some or all of the PRACH resources configured through the broadcast signal in a bit map format.

Meanwhile, according to an embodiment of the disclosure, the BS may not transmit the third signal. In this case, the UE may identify resource information corresponding to the reference signal (e.g., beam) determined in the PRACH resource information (resource information configuration for each beam) received through the broadcast signal. That is, the UE informing the BS of BS beam information making communication with the BS possible through the UDCH may detect PRACH resources associated with the BS beam corresponding to the UDCH for transmitting an uplink signal without additional signaling reception. The BS may identify PRACH resource information corresponding to the reference signal (e.g., beam) having the QCL relation with the received second signal.

The BS may receive a random access preamble through PRACH resources in operation 1240. The BS may start a random access procedure by receiving a random access preamble through PRACH resources having the QCL relation with the reference signal detected through reception of the second signal.

Meanwhile, according to various embodiments of the disclosure, the BS may configure UDCH resource information of a serving cell of the UE and/or another adjacent cell other than the serving cell through another signal other than a broadcast signal, for example, an RRC signal (for example, RRC reconfiguration, or measurement configuration). The UE may transmit the second signal to the serving cell and/or the adjacent cell through resources corresponding to the selected beam on the basis of the configured UDCH resource information. The BS receiving the second signal may configure PRACH resources corresponding to the selected beam in the UE. Alternatively, the UE may transmit a random access preamble through resources corresponding to the selected beam on the basis of pre-received PRACH resource information (including resource information corresponding to each beam), and the BS may receive the random access preamble through resources corresponding to a beam having the QCL relation with the second signal.

Hereinafter, various examples of the random access preamble transmission procedure described with reference to FIGS. 11 to 12 are described.

Figure 13:
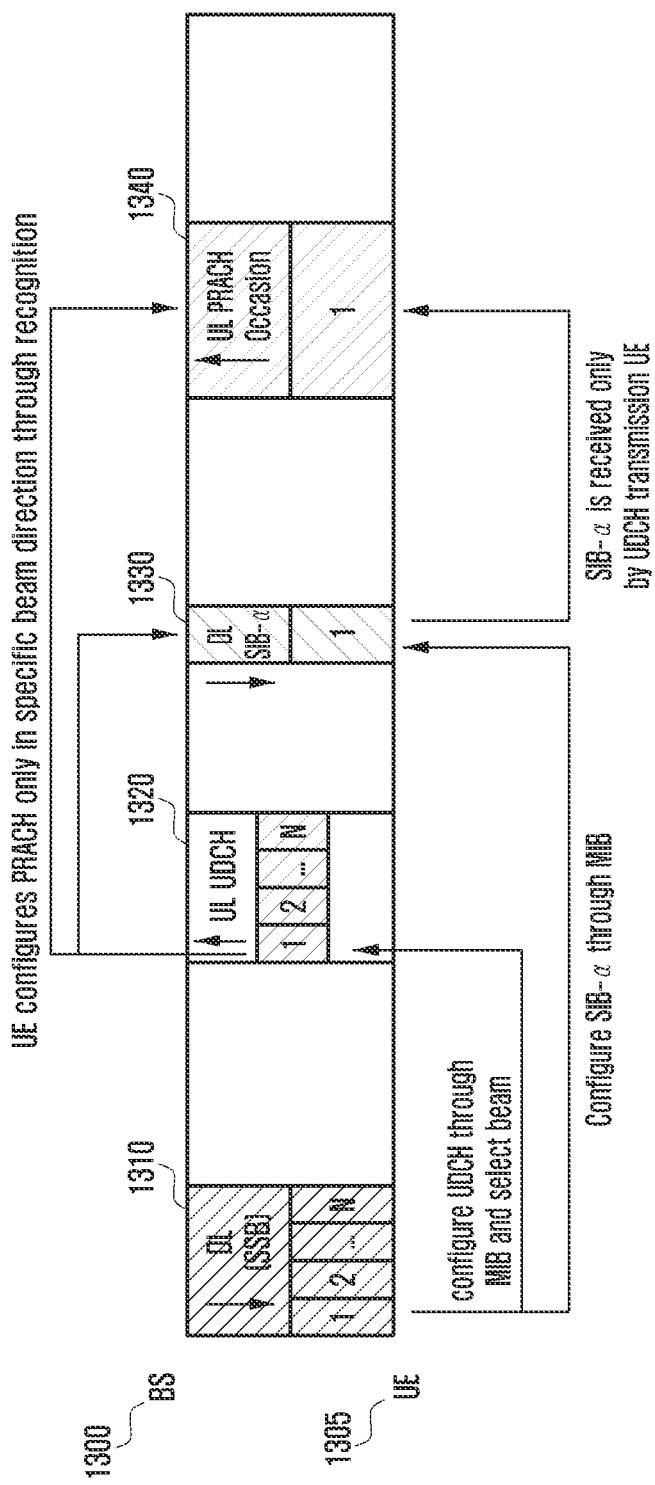
FIG. 13 illustrates a random access preamble transmission procedure according to an embodiment of the disclosure.

FIG. 13 illustrates a random access preamble transmission procedure according to an embodiment of the disclosure.

Referring to FIG. 13, in operation 1310, the BS 1300 transmits a first signal to a UE 1305 through beam sweeping. The first signal may include the reference signal as described above and may further include a broadcast signal. The first signal may be, for example, an SSB or a reference signal such as a CSI-RS.

The UE may receive the first signal transmitted by the BS in various beam directions and a combination of transmission/reception beams to select an optimal beam (reference signal).

The optimal beam may be a beam described below.

a. Beam having the best reception signal performance (RSRP, RSRQ, SINR, SNR, CQL, or RSSI, etc.)

b. Beam having the received signal performance higher than a specific threshold (value which the UE has therein or value configured by the previously accessed BS) (RSRP, RSRQ, SINR, SNR, CQI, or RSSI, etc.) and having the best received signal performance (RSRP, RSRQ, SINR, SNR, CQI, or RSSI, etc.) (SSB, CSI-RS, or CRS, etc.)

Meanwhile, the broadcast signal may include downlink cell common resource configuration. For example, the broadcast signal may include the following resource information.

a. User detection channel (UDCH) resource information for short sequence transmission for informing the BS of the existence of the UE in a specific beam direction. The UDCH is resources through which the BS receives a specific signal in all beam directions, and resources for respective beams may be configured.

b. Resources for transmitting SIB-α including configured PRACH resource information According to the example, the UE may insert the resource information into the standard, and may receive an index indicating specific resource information through an MIB or an SIB to detect resources. Alternatively, the UE may receive an MIB or an SIB directly including the resource information to detect resources.

In operation 1320, the UE 1305 may transmit a second signal to the BS 1300 through an uplink UDCH. The UE may transmit the second signal through the UDCH and inform the BS that the UE exists in the corresponding beam direction. The UE identifies resources configured in an optimal beam direction of the BS in the previously received UDCH resource information and transmits the second signal through the UDCH resources corresponding to the corresponding beam.

At this time, the second signal may have various structures, and a signal having a structure pre-appointed between the BS and the UE should be transmitted. For example, the second signal may be a signal including a specific sequence such as Zadoff-Chu, Gold, and M. At this time, the length of the sequence may be configured to be shorter than the sequence of the random access preamble. Alternatively, the second signal may be a signal for transmitting fixed transmission power for a specific time without information.

In operation 1330, the UE 1305 may receive a third signal including SIB-α from the BS 1300 on the basis of the received SIB-α resource information.

After allocating PRACH resources in a specific beam (SSB or CSI-RS) direction in which the existence of the UE is identified through the UDCH, the BS may transmit SIB-α including the allocated PRACH resources and beam (SSB or CSI-RS) information related to the corresponding resources.

At this time, the BS may transmit the SIB-α signal only in the specific beam (SSB or CSI-RS) direction in which the existence of the UE is identified through the UDCH and may reuse SIB-α resources for beams in which the existence of the UE is not identified for other downlink signal transmission.

The UE may receive the SIB-α signal through resources allocated by the broadcast signal and detect PRACH resource information and beam information associated with each PRACH.

In operation 1340, the UE 1305 may transmit a random access preamble to the BS 1300 on the basis of the received PRACH resource information.

The UE may identify PRACH resources related to an optimal beam of the BS in SIB-α and transmit a random access preamble signal through the PRACH resources related to the corresponding beam.

According to an embodiment of the disclosure, a signal which can be transmitted by the UE through the UDCH can be designed through various methods. The purpose of the corresponding signal is to allow the BS to recognize the existence of the UE, and accordingly, does not need to contain information on the UE, does not need to provide the UE location or timing information, and does not need to be normalized.

Accordingly, unlike the random access preamble, the uplink UDCH transmission signal does not need to be equal to or longer than the CP to provide timing and may have a short sequence different from the existing preamble.

Figure 14A:
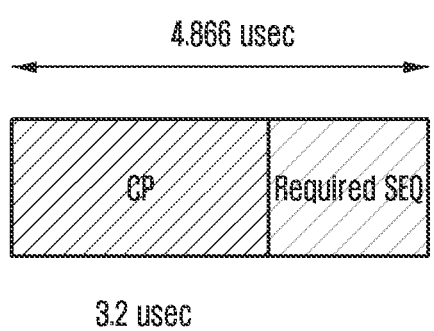
FIG. 14A illustrates an example of a user detection channel (UDCH) transmission signal structure according to an embodiment of the disclosure.
Figure 14B:
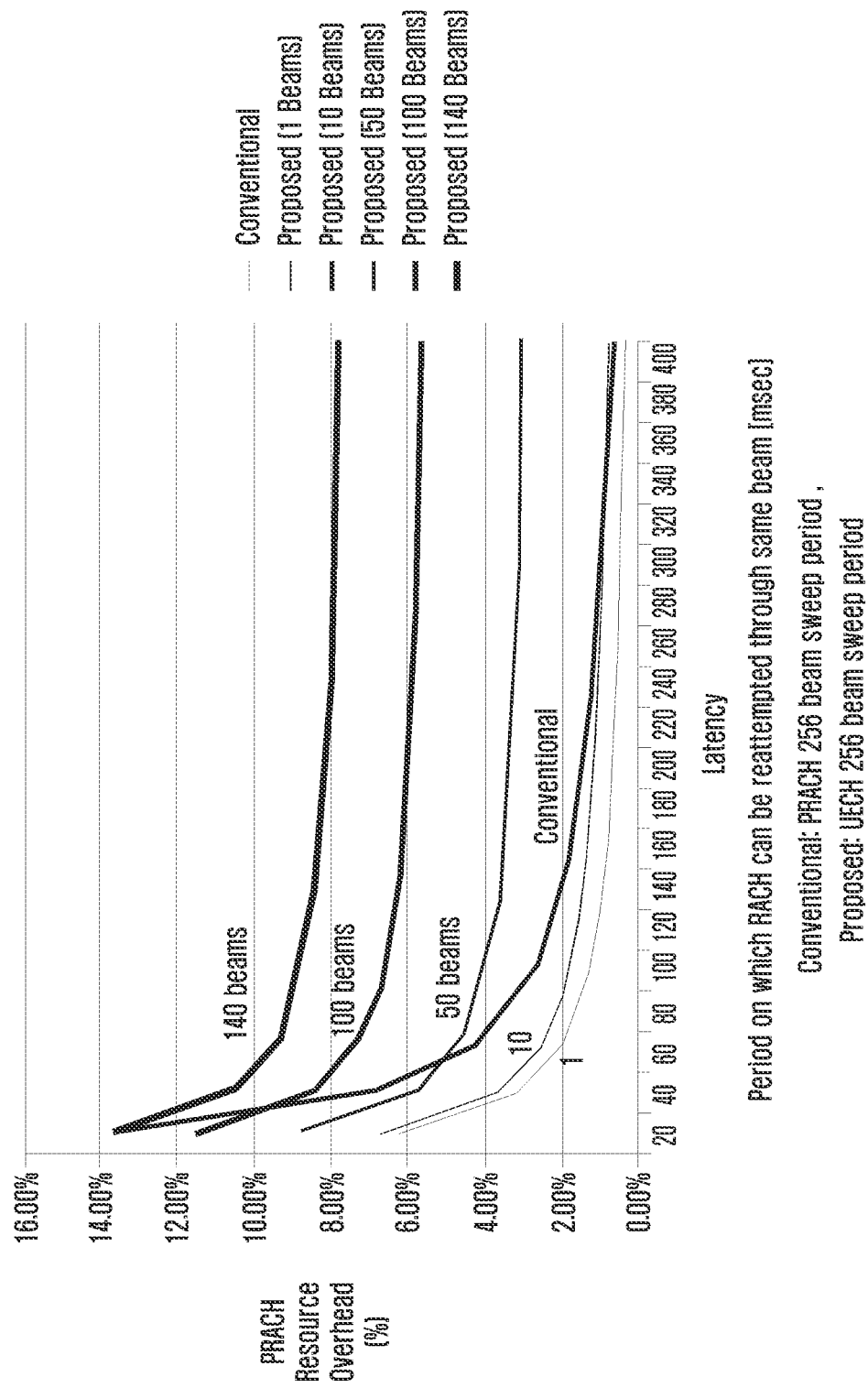
FIG. 14B illustrates improvement of overhead of PRACH resources according to a period when an embodiment of the disclosure is applied according to an embodiment of the disclosure.

FIG. 14A illustrates an example of a user detection channel (UDCH) transmission signal structure according to an embodiment of the disclosure, and FIG. 14B illustrates improvement of overhead of PRACH resources according to a period when an embodiment of the disclosure is applied according to an embodiment of the disclosure.

Referring to FIG. 14A, it illustrates an example of designing an uplink signal transmitted through the UDCH using a Zadoff-Chu sequence in consideration of coverage of 500 m. The corresponding signal is used just to identify the existence or the nonexistence of the UE and thus the generation of only at least one peak in the observation period is enough and it is not required to accurately measure timing, so that it does not matter that the sequence length is very smaller than the CP and that UEs perform duplicate transmission, so that a very short sequence length has no problem.

In another example, the sequence may be a signal filled with only energy for only energy detection, and of course may be another sequence having various structures and generation rules such as an m-sequence and a gold-sequence.

In an embodiment of the disclosure, UDCH resources are added and thus generated overhead increases compared to the technology of configuring PRACH resources in all beam direction of the related art, but a signal delay and overhead may be improved by configuring only PRACH resources corresponding to the selected beam.

Referring to FIG. 14B, it is a graph showing analysis of the signal delay and the overhead. A horizontal axis is a random access preamble transmission delay and corresponds to a time delay (period) during which the UE can attempt again random access through the same beam. In the technology of the related art, PRACHs are periodically allocated for 256 beams by turns in which case a value of the horizontal axis is a PRACH allocation period. According to an embodiment of the disclosure, when the UDCH is allocated and the UE transmits an uplink signal through the UDCH, required PRACH resources are allocated in which a value of the horizontal axis is a UDCH resource allocation period.

A vertical axis expresses percentage % of overhead that is an occupancy rate of PRACH resources in total radio resources.

FIG. 14B is a graph when the number of UEs simultaneously making a request for random access is 1, 10, 50, 100, and 140 per UDCH channel configuration period. In the graph, the technology of the related art has an increase (slope) in overhead to be endured to reduce the delay rapidly increases compared to the proposed technology of the disclosure. When the delay decreases, in the proposed technology of the disclosure, the case of small overhead rapidly increases compared to the technology of the related art.

Further, when the number of UEs which desire to simultaneously perform random access is small (for example, smaller than 10), most of the delays and overheads of the proposed technology of the disclosure are lower.

In an environment in which the cell size gradually becomes smaller and the number of beams gradually becomes larger, it is apparent that the number of UEs which desire to simultaneously perform random access is not large, and thus the performance of the random access operation can be improved according to an embodiment of the disclosure.

FIG. 15 illustrates a random access preamble transmission procedure according to an embodiment of the disclosure.

The embodiment illustrated in FIG. 15 is similar to the embodiment illustrated in FIG. 13. However, although a broadcast signal is transmitted while being inserted into a first signal in FIG. 13, the broadcast signal may be transmitted through a separate SIB (for example, an SIB or an on-demand SIB) according to this embodiment.

Referring to FIG. 15, in operation 1510, the BS 1500 transmits a first signal to a UE 1505 through beam sweeping. The first signal may include a reference signal. The first signal may also include resource information (SIB resource information) for transmitting the SIB.

The UE may receive the first signal transmitted by the BS in various beam directions and a combination of transmission/reception beams to select an optimal beam (reference signal).

In operation 1520, the BS 1500 may transmit the SIB to the UE 1505 on the basis of SIB resource information. The SIB may include the following resource information.

a. UDCH resource information for short sequence transmission for informing the BS of the existence of the UE in a specific beam direction. The UDCH is resources through which the BS receives a specific signal in all beam directions, and resources for respective beams may be configured.

b. Resources for transmitting SIB-α including configured PRACH resource information According to the example, the UE may insert the resource information into the standard, receive an index indicating specific resource information through the SIB, and detect resources. Alternatively, the UE may receive the SIB directly including the resource information and detect the resources.

In operation 1530, the UE 1505 may transmit a second signal to the BS 1500 through an uplink UDCH. The UE may transmit the second signal through the UDCH and inform the BS that the UE exists in the corresponding beam direction. The UE identifies resources configured in an optimal beam direction of the BS in the previously received UDCH resource information and transmits the second signal through the UDCH resources corresponding to the corresponding beam.

In operation 1540, the UE 1505 may receive a third signal including SIB-α from the BS 1500 on the basis of the received SIB-α resource information.

After allocating PRACH resources in a specific beam (SSB or CSI-RS) direction in which the existence of the UE is identified through the UDCH, the BS may transmit SIB-α including the allocated PRACH resources and beam (SSB or CSI-RS) information related to the corresponding resources.

At this time, the BS may transmit the SIB-α signal only in the specific beam (SSB or CSI-RS) direction in which the existence of the UE is identified through the UDCH and may reuse SIB-α resources for beams in which the existence of the UE is not identified for other downlink signal transmission.

The UE may receive the SIB-α signal through allocated resources and detect PRACH resource information and beam information associated with each PRACH.

In operation 1550, the UE 1505 may transmit a random access preamble to the BS 1500 on the basis of the received PRACH resource information.

The UE may identify PRACH resources related to an optimal beam of the BS in SIB-α and transmit a random access preamble signal through the PRACH resources related to the corresponding beam.

Figure 16:
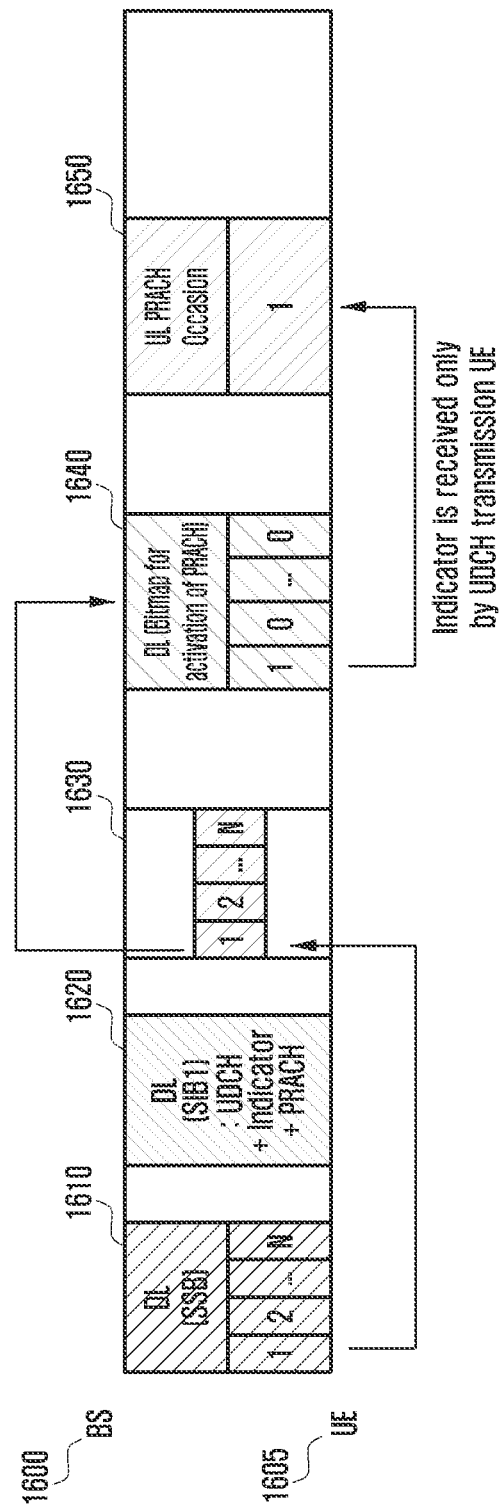
FIG. 16 illustrates a random access preamble transmission procedure according to an embodiment of the disclosure.

FIG. 16 illustrates a random access preamble transmission procedure according to an embodiment of the disclosure.

The embodiment illustrated in FIG. 16 is similar to the embodiment illustrated in FIG. 15, but the BS which recognizes that the UE exists in a specific beam direction configures PRACH resources in the UE and informs of the configuration through a bit map. According to an embodiment of the disclosure, the BS may configure PRACH candidate resource information in all beam directions through a SIB broadcasted to the UE (for example, SIB1) and inform of activation (selection) of resources corresponding to the selected beam through a bit-map-based signal transmitted after the configuration of PRACH resources. When the bit map corresponding to the PRACH in a specific beam direction is toggled (1), the UE receiving the bit map may recognize the selection of PRACH resources in the corresponding beam direction and transmit a random access preamble through the resources.

Referring to FIG. 16, in operation 1610, the BS 1600 transmits a first signal to a UE 1605 through beam sweeping. The first signal may include a reference signal. The first signal may also include resource information (SIB resource information) for transmitting the SIB.

The UE may receive the first signal transmitted by the BS in various beam directions and a combination of transmission/reception beams to select an optimal beam (reference signal).

In operation 1620, the BS 1600 may transmit the SIB to the UE 1605 on the basis of SIB resource information. The SIB may include the following resource information.

a. UDCH resource information for short sequence transmission for informing the BS of the existence of the UE in a specific beam direction. The UDCH is resources through which the BS receives a specific signal in all beam directions, and resources for respective beams may be configured.

b. PRACH candidate resource information allocated in each of all beam directions c. Resource information for transmitting a bit-map-based signal informing of activation (selection) of resources corresponding to a selected beam in the PRACH candidate resource information In operation 1630, the UE 1605 may transmit a second signal to the BS 1600 through an uplink UDCH. The UE may transmit the second signal through the UDCH and inform the BS that the UE exists in the corresponding beam direction. The UE identifies resources configured in an optimal beam direction of the BS in the previously received UDCH resource information and transmits the second signal through the UDCH resources corresponding to the corresponding beam.

In operation 1640, the UE 1605 may receive a bit-map-based third signal informing of activation (selection) of resources corresponding to the selected beam in the PRACH candidate resource information from the BS 1600.

In operation 1650, the UE 1605 may transmit a random access preamble to the BS 1600 on the basis of the received PRACH resource information.

The UE may identify PRACH resources related to an optimal beam of the BS in SIB-α and transmit a random access preamble signal through the PRACH resources related to the corresponding beam.

Figure 17:
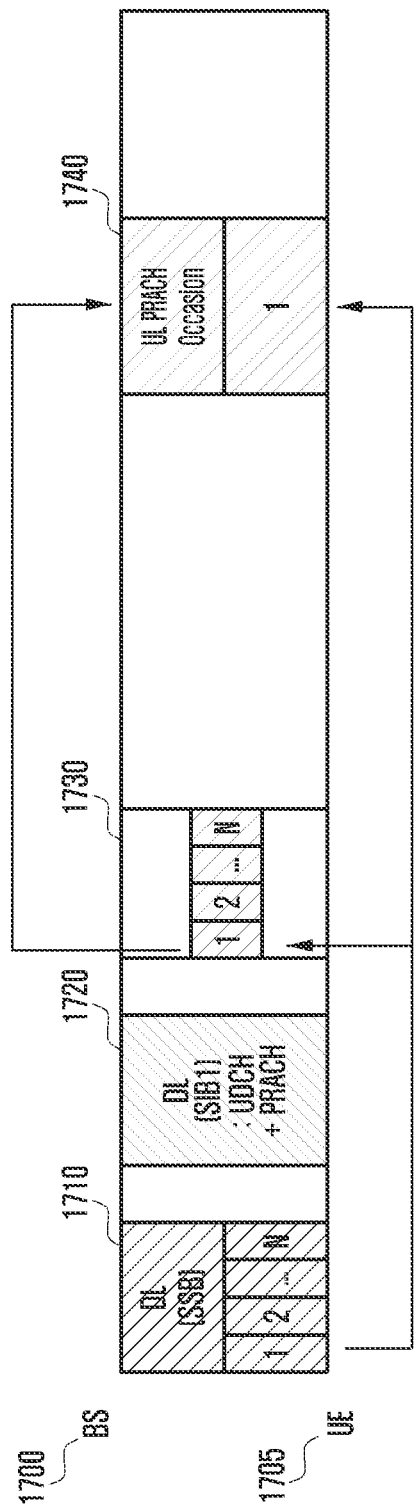
FIG. 17 illustrates a random access preamble transmission procedure according to an embodiment of the disclosure.

FIG. 17 illustrates a random access preamble transmission procedure according to an embodiment of the disclosure.

The embodiment illustrated FIG. 17 is similar to the embodiment illustrated in FIG. 16, but the BS configures PRACH resource information for each beam in the UE through the SIB and receives, only when a beam corresponding to the UE location is identified through a UDCH, a random access preamble through PRACH resources corresponding to the corresponding identified beam. That is, according to this embodiment, the UE and the BS may transmit and receive the random access preamble without signaling for an additional PRACH resource configuration.

Referring to FIG. 17, in operation 1710, the BS 1700 transmits a first signal to a UE 1705 through beam sweeping. The first signal may include a reference signal. The first signal may also include resource information (SIB resource information) for transmitting the SIB.

The UE may receive the first signal transmitted by the BS in various beam directions and a combination of transmission/reception beams to select an optimal beam (reference signal).

In operation 1720, the BS 1700 may transmit the SIB to the UE 1705 on the basis of SIB resource information. The SIB (for example, SIB1) may include the following resource information.

a. UDCH resource information for short sequence transmission for informing the BS of the existence of the UE in a specific beam direction. The UDCH is resources through which the BS receives a specific signal in all beam directions, and resources for respective beams may be configured.

b. PRACH candidate resource information allocated in each of all beam directions In operation 1730, the UE 1705 may transmit a second signal to the BS 1700 through an uplink UDCH. The UE may transmit the second signal through the UDCH and inform the BS that the UE exists in the corresponding beam direction. The UE identifies resources configured in an optimal beam direction of the BS in the previously received UDCH resource information and transmits the second signal through the UDCH resources corresponding to the corresponding beam.

In operation 1740, the UE 1705 may detect PRACH resource information corresponding to the selected beam of the BS in PRACH candidate resource information and transmit the random access preamble to the BS 1700 therethrough. The BS may also detect PRACH resource information corresponding to the beam related to the received second signal and receive the random access preamble therethrough.

However, according to this embodiment, when the BS fails in decoding of the second signal transmitted through the UDCH, a preamble signal transmitted by the UE may act as interference to other transmissions.

Hereinafter, a new preamble transmission structure and design to improve preamble efficiency according to another embodiment of the disclosure is described.

Figure 18:
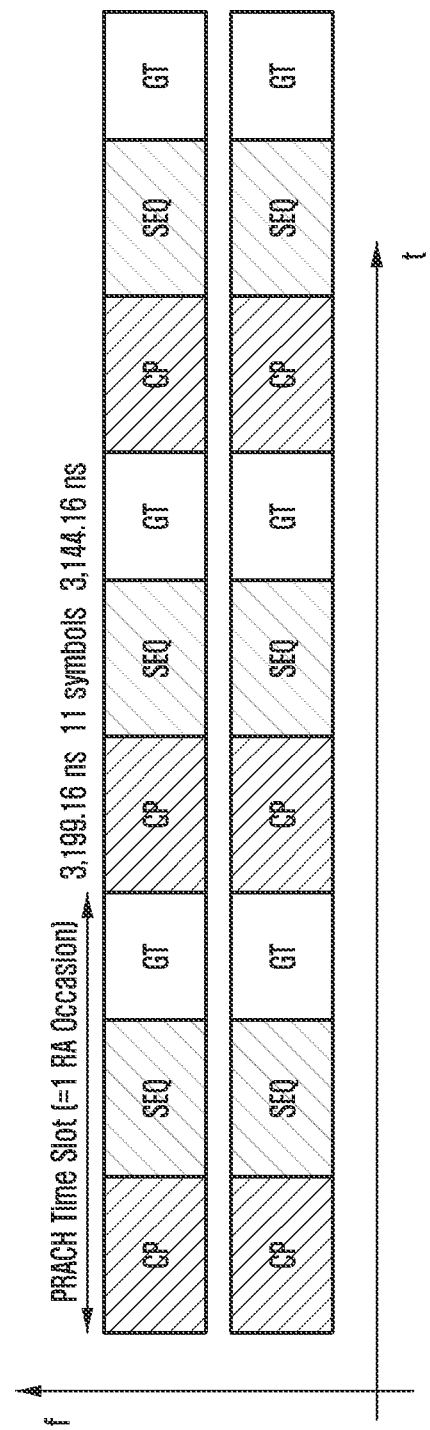
FIG. 18 illustrates a structure of a random access preamble in a wireless communication system according to an embodiment of the disclosure.

FIG. 18 illustrates the existing random access preamble structure in a wireless communication system according to an embodiment of the disclosure.

Referring to FIG. 18, the illustrated existing preamble design has the structure in which a CP for securing cell coverage is added before a preamble sequence and a guard time for correcting inter-symbol interference is added after the preamble sequence.

In a system environment in which the BS receives random access preambles by turns using multiple beams, the standardized structure of CP—Sequence—Guard Time is doing more harm than good. An unnecessary guard time should be detected and not be configured, and the guard time should be configured only when absolutely necessary.

Figure 19A:
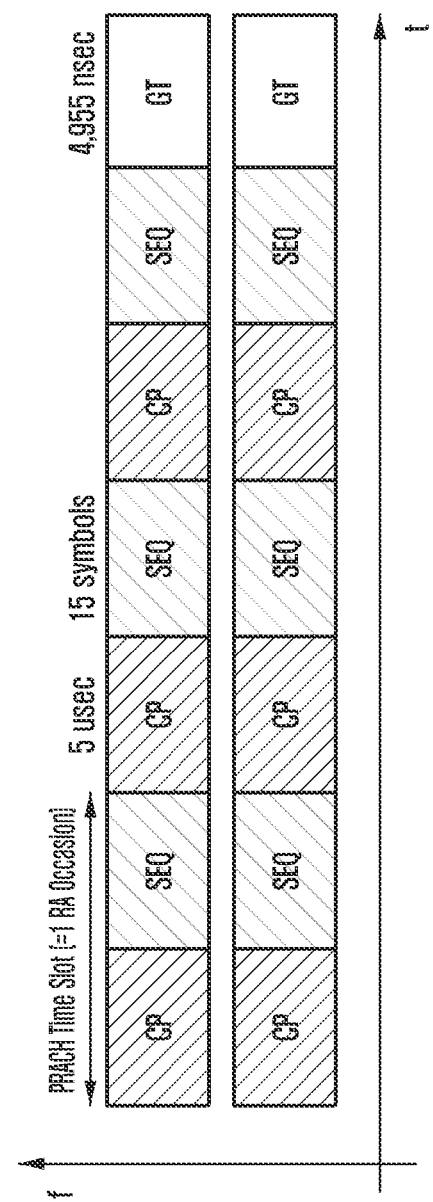
FIG. 19A illustrates the structure of a random access preamble according to an embodiment of the disclosure.
Figure 19B:
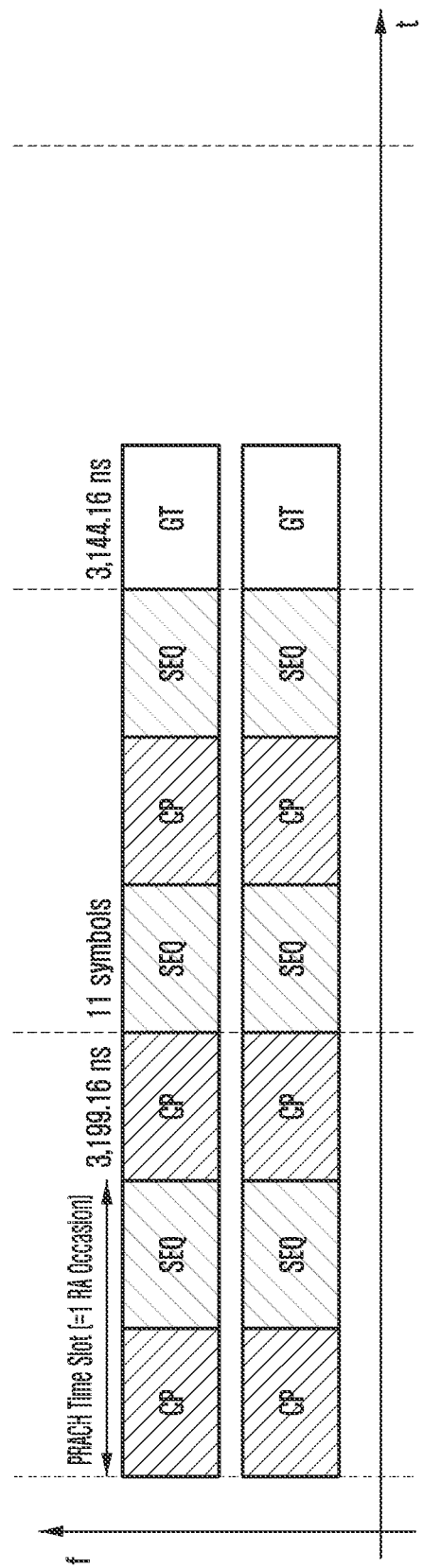
FIG. 19B illustrates the structure of a random access preamble according to an embodiment of the disclosure.
Figure 19C:
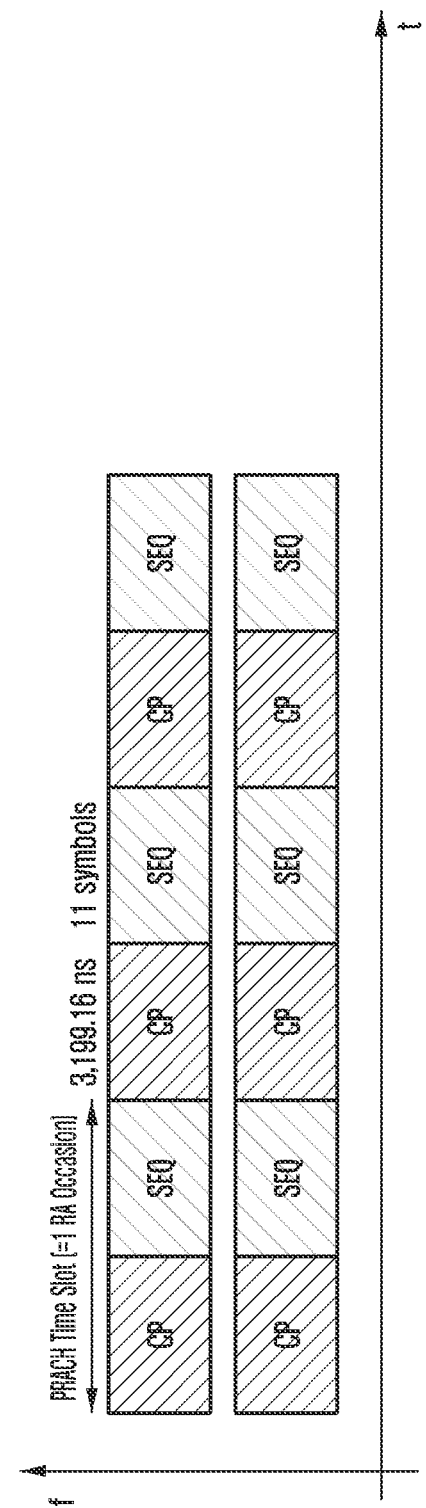
FIG. 19C illustrates the structure of a random access preamble according to an embodiment of the disclosure.

FIG. 19A illustrates the structure of a random access preamble according to an embodiment of the disclosure, FIG. 19B illustrates the structure of a random access preamble according to an embodiment of the disclosure, and FIG. 19C illustrates the structure of a random access preamble according to an embodiment of the disclosure.

Referring to FIG. 19A, it proposes the structure in which there is no guard time between PRACH time slots and there is one guard time only at the last time point at which consecutive PRACH time slots end.

Through the proposed structure, it is possible to support a cell having wider coverage using a longer CP since there is no guard time between consecutive PRACH time slots, and more improve a sequence reception success probability and an SINR due to a longer sequence length.

For example, in comparison between the existing preamble structure having the same PRACH time slot length of 10 usec and the preamble in FIG. 19A, while the existing structure supports the coverage of 470 m, the structure in FIG. 19A may increase the CP and sequence lengths to support the coverage of 743 m, thereby securing additional coverage of 60%. To convert the value into an area, a 1.5 times higher area may be additionally supported and thus a very large cell may exist.

Alternatively, referring to FIG. 19B, a PRACH time slot in which resource overhead having a short PRACH time slot supporting the same coverage is reduced may be configured.

Meanwhile, referring to FIG. 19C, there is short preamble type A1 in which there is not guard time in NR. A specific type in which only a CP and a sequence exist is defined to be used only when an uplink reference is determined and there is no need to consider delay spread.

On the other hand, the preamble structure according to an embodiment of the disclosure includes one guard time at the end and can support any random access. Various methods of configuring the guard time at the end once are described below in detail.

Figure 20A:
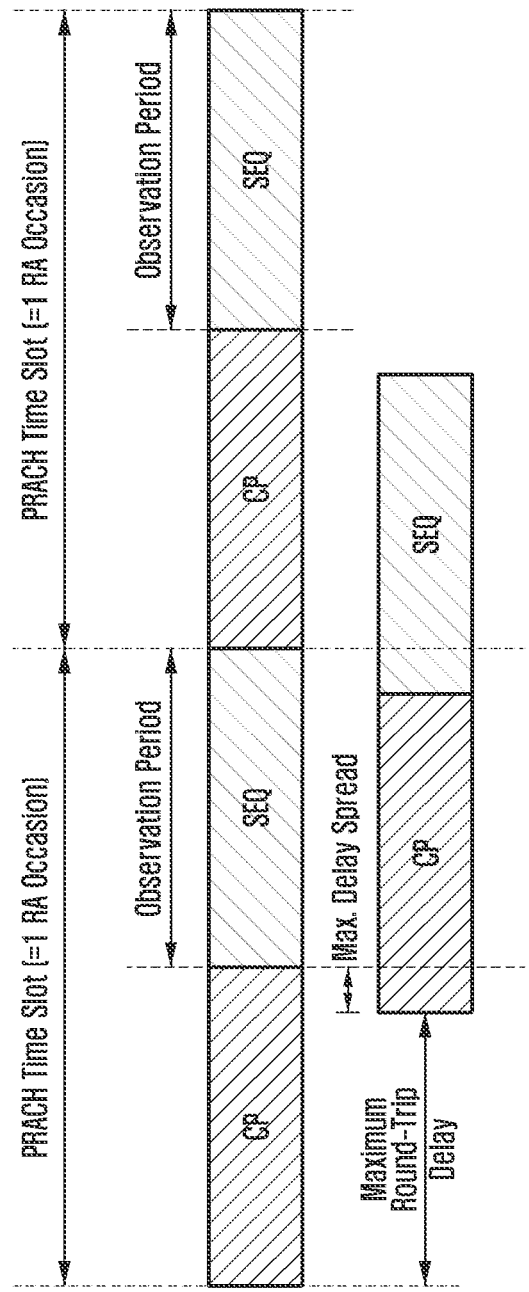
FIG. 20A illustrates whether a guard time is needed in a random access preamble structure according to an embodiment of the disclosure.

FIG. 20A illustrates whether a guard time is needed in a random access preamble structure according to an embodiment of the disclosure.

Referring to FIG. 20A, the reason why the guard time is removed between PRACH time slots is described below. The guard time basically exist to prevent performance deterioration due to a propagation delay, a switching time, and inter-symbol interference between consecutively transmitted and received signals. Influence between consecutive PRACH time slots is described with reference to FIG. 20A. The consecutive PRACH time slots are configured to have a sufficient CP, and there is no another sequence or interference only within an observation period in which the BS detects the sequence. Accordingly, there is no influence of a delay, a switching time, and inter-symbol interference generated by removing the guard time between consecutive PRACH time slots having a CP longer than a maximum round trip delay. Therefore, there is no need to include the guard time between consecutive PRACH time slots.

Figure 20B:
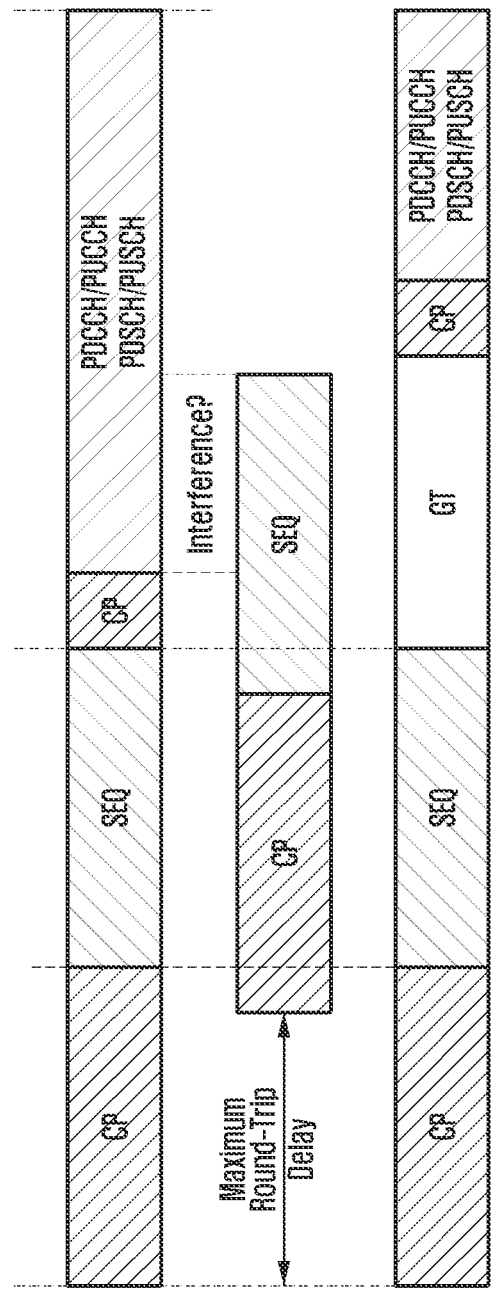
FIG. 20B illustrates whether a guard time is needed in a random access preamble structure according to an embodiment of the disclosure.

FIG. 20B illustrates whether a guard time is needed in a random access preamble structure according to an embodiment of the disclosure.

Referring to FIG. 20B, subsequently, in uplink/downlink control or data signal transmission is performed after the PRACH time slot, when any control or data signal transmission having a short CP is performed after the PRACH time slot, there may be interference influence due to other preamble transmission experiencing a round trip delay. Therefore, when uplink/downlink control or data signal transmission is performed after the PRACH time slot, the guard time is needed to remove the interference influence.

In order to improve resource efficiency while removing the interference influence, various embodiments of the disclosure have the structure in which the guard time is reflected once only when there is no guard time between consecutive PRACH time slots, and consecutive PRACH time slots end and a control/data slot starts.

Figure 21:
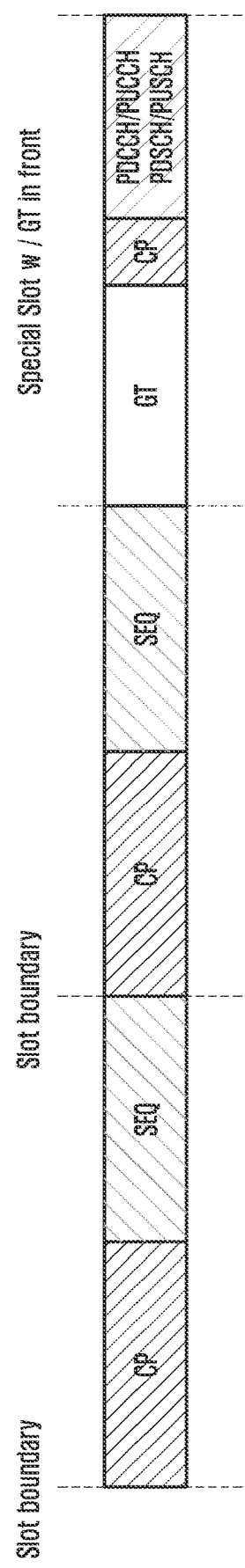
FIG. 21 illustrates an example of the structure of a random access preamble according to an embodiment of the disclosure.

FIG. 21 illustrates an example of the structure of a random access preamble according to an embodiment of the disclosure.

Referring to FIG. 21, an embodiment of the disclosure proposes "a special frame (special slot) in which a guard time exist in the front". For example, consecutive PRACH time slots accurately end at the data slot boundary, and a first slot connected thereto may include a guard time in the front and a special frame in which signal transmission starts from an intermediate part (for example, predetermined part) thereafter. To this end, a special frame in such a frame should be standardized and supported in the standard, and a method indicating when and how to configure and use the special frame should also be standardized.

Figure 22:
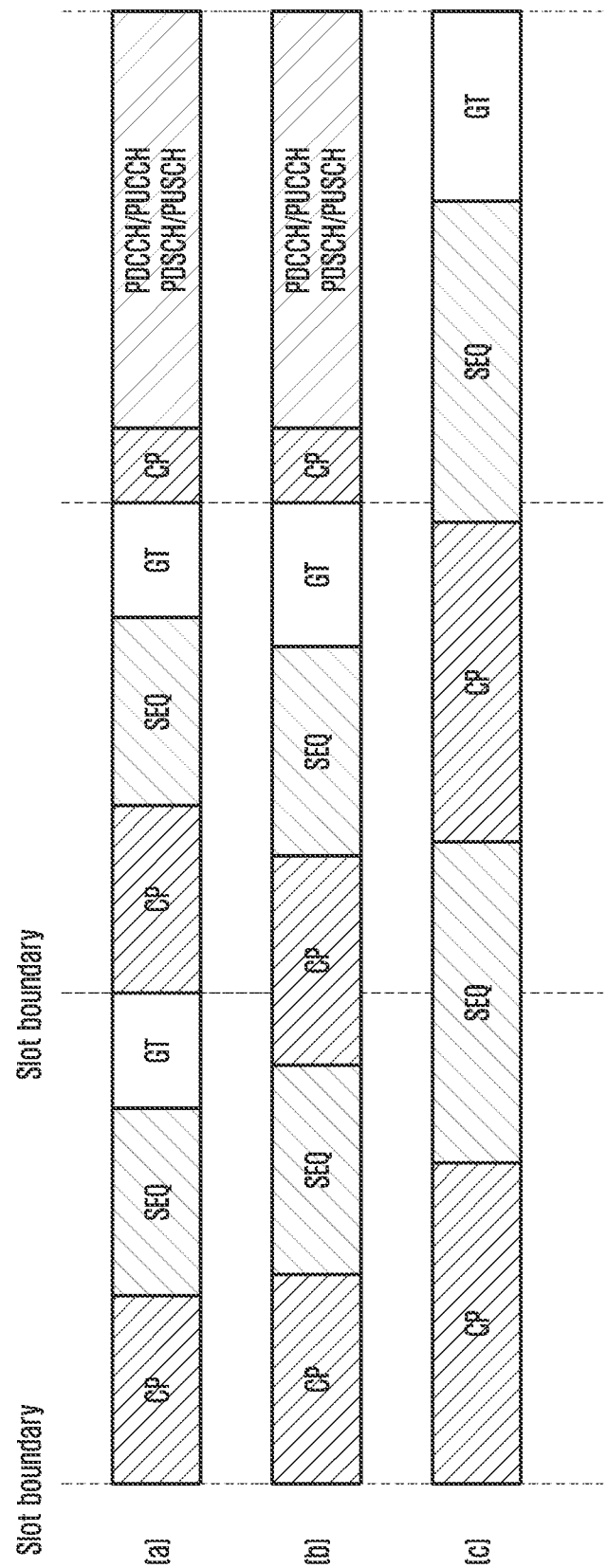
FIG. 22 illustrates various examples of a random access preamble according to an embodiment of the disclosure.

Special frame configuration methods according to various embodiments of the disclosure are described below.

a) Fixedly and always allocate: a first slot after RA occasion burst is always configured as a special slot b) Allocate through indicator: when information including an RACH configuration such as SIB1 or an RRC message includes an indicator, a first slot after each RA occasion burst is configured as a special slot c) Allocate through TDD configuration: a TDD configuration considering a special frame is indicated and configured d) Allocate through RA preamble type: a preamble structure having a GT at the end is configured in the standard and indicated and configured as an RA preamble type FIG. 22 illustrates various examples of the random access preamble structure according to an embodiment of the disclosure.

Referring to FIG. 22, an embodiment of the disclosure proposes "consecutive PRACH time slots including one last guard time accurately at a data slot boundary". For example, FIG. 22 proposes, as an embodiment of the disclosure, the structure in which the configuration is performed over "a plurality of data slots" and only 1 GP exists at the end such as the structure (b) in which the configuration is performed over 2 data slots and only 1 GT exists at the end or the structure (c) in which the configuration is performed over 3 data slots and only 1 GT exists at the end when the existing configuration is (a). Such a structure has an advantage of no need to additionally design the special frame as illustrated in FIG. 21, a configuration should be performed such that a plurality of PRACH time slots which may have various lengths should exist accurately within the data slot boundary.

Figure 23:
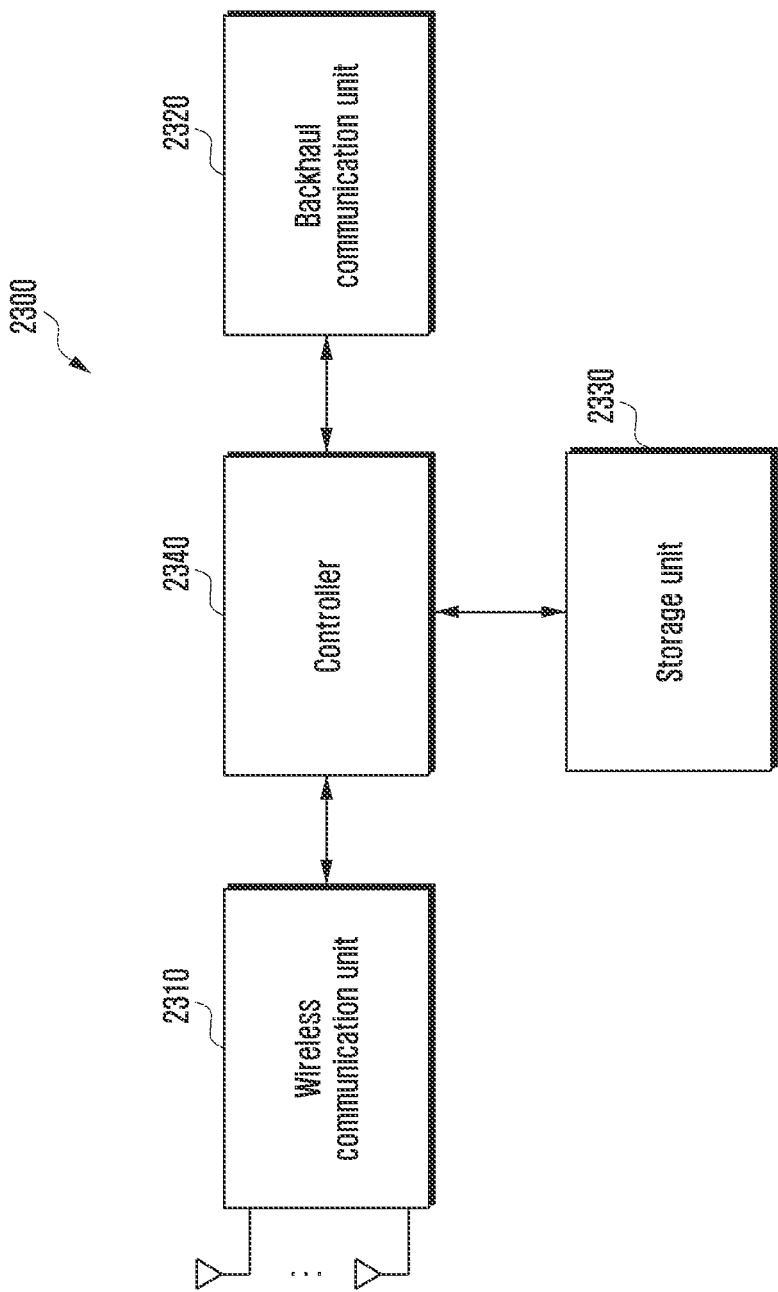
FIG. 23 illustrates a schematic structure of a BS according to an embodiment of the disclosure.

To this end, various PRACH structures in such a shape should be standardized and supported in the standard, and a method indicating when and how to configure and use the same should also be standardized PRACH structure configuration methods according to various embodiments of the disclosure are described below.

d) Allocate through RA preamble type: a preamble structure of spanning over a plurality of slots is configured in the standard and indicated and configured as an RA preamble type b) Allocate through PRACH configuration index (radio frame architecture): a PRACH configuration supporting the preamble structure of spanning over a plurality of slots with corresponding length and size in the RF structure is configured, indicated, and allocated FIG. 23 is a block diagram of a BS in a wireless communication system according to an embodiment of the disclosure.

The configuration illustrated in FIG. 23 may be understood as a configuration of a BS 2300. The term " . . . unit", or the ending of a word, such as " . . . or", " . . . er", or the like, may indicate a unit of processing at least one function or operation, which may be embodied in hardware, software, or a combination of hardware and software.

Referring to FIG. 23, the BS 2300 includes a wireless communication unit 2310, a backhaul communication unit 2320, a storage unit 2330, and a controller 2340. However, the elements of the BS are not limited to the above example. For example, the BS may include more or fewer elements than the above-described elements. Also, the wireless communication unit 2310, the backhaul communication unit 2320, the storage unit 2330, and the controller 2340 may be implemented in a single chip form. The controller 2340 may include one or more processors.

The wireless communication unit 2310 performs functions for transmitting and receiving a signal through a radio channel. For example, the wireless communication unit 2310 performs a function of conversion between a baseband signal and a bitstream according to the physical-layer standard of the system. For example, in data transmission, the wireless communication unit 2310 generates complex symbols by encoding and modulating a transmission bitstream. In data reception, the wireless communication unit 2310 reconstructs a reception bitstream by demodulating and decoding a baseband signal.

The wireless communication unit 2310 up-converts a baseband signal into a radio-frequency (RF) band signal, transmits the RF band signal through an antenna, and down-converts an RF band signal received through an antenna into a baseband signal. To this end, the wireless communication unit 2310 may include a transmission filter, a reception filter, an amplifier, a mixer, an oscillator, a digital-to-analog convertor (DAC), an analog-to-digital convertor (ADC), and the like. Further, the wireless communication unit 2310 may include a plurality of transmission and reception paths. In addition, the wireless communication unit 2310 may include at least one antenna array including a plurality of antenna elements.

On the hardware side, the wireless communication unit 2310 may include a digital unit and an analog unit, and the analog unit may include a plurality of sub-units according to operating power, operating frequency, and the like. The digital unit may be implemented as at least one processor (for example, digital signal processor (DSP)).

The wireless communication unit 2310 transmits and receives a signal as described above. Accordingly, all or part of the wireless communication unit 2310 may be referred to as a "transmitter", a "receiver", or a "transceiver". Further, in the following description, transmission and reception performed through a radio channel may include the above-described processing by the wireless communication unit 2310.

The backhaul communication unit 2320 provides an interface for communicating with other nodes within the network. That is, the backhaul communication unit 2320 converts a bitstream transmitted from the BS 2300 to another node, for example, another access node, another BS, a higher node, or a core network, into a physical signal, and converts a physical signal received from another node into a bitstream.

The storage unit 2330 stores data such as a basic program, an application, and configuration information for the operation of the BS 2300. The storage unit 2330 may include volatile memory, nonvolatile memory, or a combination of volatile memory and nonvolatile memory. The storage unit 2330 provides stored data in response to a request from the controller 2340.

The controller 2340 controls the overall operations of the BS 2300. For example, the controller 2340 transmits and receives a signal through the wireless communication unit 2310 or the backhaul communication unit 2320. The controller 2340 records data in the storage unit 2330 and reads the same. The controller 2340 may perform the functions of a protocol stack required according to communication standards. According to another implementation, the protocol stack may be included in the wireless communication unit 2310. To this end, the controller 2340 may include at least one processor. According to embodiments, the controller 2340 may control the operation performed by the BS 2300 according to the various embodiments of the disclosure described above.

For example, the controller 2340 may perform control to transmit a first signal including at least one reference signal to the UE, receive a second signal for informing of the UE location from the UE through first uplink resources, identify physical random access channel (PRACH) resources corresponding to a reference signal selected by the UE on the basis of the second signal, and receive a random access preamble from the UE through the PRACH resources.

For example, the controller 2340 may further perform control to transmit a third signal including information on the PRACH resources to the UE.

For example, the controller 2340 may further perform control to transmit at least one of information on first uplink resources corresponding to respective reference signals, information on resources for transmitting the third signal, and information on PRACH resources corresponding to respective reference signals to the UE through the first signal or a separate signal.

For example, the controller 2340 may further perform control to transmit at least one of the information on first uplink resources corresponding to respective reference signals and the information on PRACH resources corresponding to respective reference signals to the UE through the first signal or a separate signal.

Figure 24:
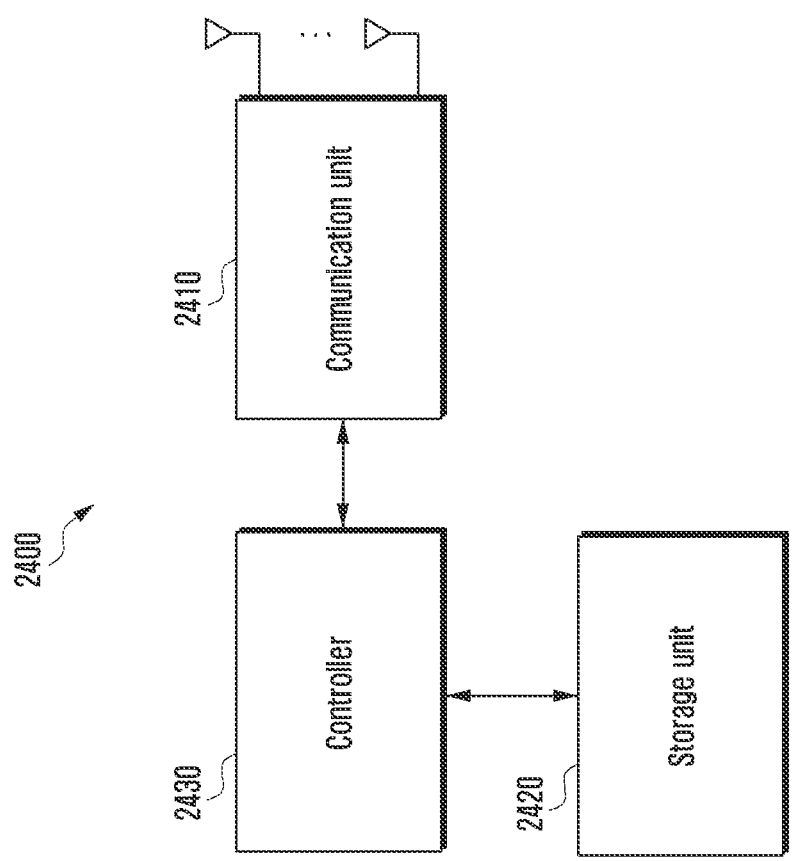
FIG. 24 illustrates a schematic structure of a UE according to an embodiment of the disclosure.

FIG. 24 is a schematic block diagram of a UE in a wireless communication system according to an embodiment of the disclosure.

The configuration illustrated in FIG. 24 may be understood as a configuration of a UE 2400. The term " . . . unit", or the ending of a word, such as " . . . or", " . . . er", or the like, may indicate a unit of processing at least one function or operation, which may be embodied in hardware, software, or a combination of hardware and software.

Referring to FIG. 24, the UE 2400 includes a communication unit 2410, a storage unit 2420, and a controller 2430. However, the elements of the UE 2400 are not limited thereto. For example, the UE 2400 may include more elements or fewer elements than the above-described elements. Also, the communication unit 2410, the storage unit 2420, and the controller 2430 may be implemented in a single chip form. The controller 2430 may include one or more processors.

The communication unit 2410 performs functions for transmitting and receiving a signal through a radio channel. For example, the communication unit 2410 performs a function of conversion between a baseband signal and a bitstream according to a physical-layer standard of the system. For example, in data transmission, the communication unit 2410 generates complex symbols by encoding and modulating a transmission bitstream. In data reception, the communication unit 2410 reconstructs a reception bitstream by demodulating and decoding a baseband signal. Further, the communication unit 2410 up-converts a baseband signal to an RF band signal, transmits the RF band signal through an antenna, and then down-converts the RF band signal received through the antenna to the baseband signal. For example, the communication unit 2410 may include a transmission filter, a reception filter, an amplifier, a mixer, an oscillator, a DAC, and an ADC.

The communication unit 2410 may include a plurality of transmission and reception paths. The communication unit 2410 may include at least one antenna array including a plurality of antenna elements. On the hardware side, the communication unit 2410 may include a digital circuit and an analog circuit (for example, a radio frequency integrated circuit (RFIC)). The digital circuit and the analog circuit may be implemented as a single package. The communication unit 2410 may include a plurality of RF chains. The communication unit 2410 may perform beamforming.

The communication unit 2410 transmits and receives a signal as described above. Accordingly, all or some of the communication unit 2410 may be referred to as a "transmitter", a "receiver", or a "transceiver". In the following description, transmission and reception performed through a radio channel are used to have a meaning including the processing performed by the communication unit 2410.

The storage unit 2420 stores data such as a basic program, an application, and configuration information for the operation of the UE 2400. The storage unit 2420 may include volatile memory, nonvolatile memory, or a combination of volatile memory and nonvolatile memory. The storage unit 2420 provides stored data in response to a request from the controller 2430.

The controller 2430 controls the overall operations of the UE 2400. For example, the controller 2430 transmits and receives a signal through the communication unit 2410. The controller 2430 records data in the storage unit 2420 and reads the same. The controller 2430 may perform the functions of a protocol stack required by the communication standard. To this end, the controller 2430 may include at least one processor or microprocessor, or may be a part of the processor. Further, the part of the communication unit 2410 or the controller 2430 may be referred to as a communications processor (CP). According to an embodiment, the controller 2430 may control the operation performed by the UE 2400 according to the various embodiments of the disclosure described above.

For example, the controller 2430 may perform control to receive a first signal including at least one reference signal from the BS, measure the at least one reference signal, transmit a second signal for informing of the UE location to the BS through first uplink resources corresponding to a selected reference signal, and transmit a random access preamble through physical random access channel (PRACH) resources corresponding to the selected reference signal.

For example, the controller 2430 may further perform control to receive a third signal including information on PRACH resources corresponding to the selected reference signal from the BS.

For example, the controller 2430 may further perform control to receive at least one of information on first uplink resources corresponding to respective reference signals, information on resources for transmitting the third signal, and information on PRACH resources corresponding to respective reference signals from the BS through the first signal or a separate signal For example, the controller 2430 may further perform control to receive at least one of the information on first uplink resources corresponding to respective reference signals and the information on PRACH resources corresponding to respective reference signals from the BS through the first signal or a separate signal, and identify PRACH resources corresponding to the selected reference signal on the basis of information on the PRACH resources corresponding to the respective reference signals.

The methods according to various embodiments described in the claims or the specification of the disclosure may be implemented by hardware, software, or a combination of hardware and software.

When the methods are implemented by software, a non-transitory computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (e.g., software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

Meanwhile, the operations proposed in various embodiments of the disclosure can be combined into one sequence and performed within a range that is not against the operations. That is, each of the UE and the BS may combine and perform at least two operations presented by the various embodiments proposed above within a range that is not against each other in order to transmit a preamble to allow the UE to perform a random access procedure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
   receiving, from a base station, a first signal including at least one reference signal;
   selecting a reference signal by measuring the at least one reference signal;
   transmitting, to the base station, a second signal through a first uplink resource corresponding to the selected reference signal;
   receiving, from the base station, a message comprising information on a physical random access channel (PRACH) resource corresponding to the selected reference signal based on the second signal; and
   transmitting, to the base station, a random access preamble through the PRACH resource corresponding to the selected reference signal.

2. The method of claim 1,
   wherein the at least one reference signal comprises at least one of a synchronization signal block (SSB) or a channel state information reference signal (CSI-RS).

3. The method of claim 1,
   wherein at least one of information on first uplink resources corresponding to each reference signal, or information on a resource through which the message is transmitted is received through the first signal or a separate signal.

4. The method of claim 1,
   wherein the selecting of the reference signal comprises:
   measuring the at least one reference signal; and
   selecting the reference signal having a beset signal strength among the at least one reference signal based on the measuring of the at least one reference signal.

5. The method of claim 1, wherein the second signal is a signal having predetermined energy or a signal having a sequence shorter than a sequence of the random access preamble.

6. A method performed by a base station in a wireless communication system, the method comprising:
   transmitting, to a terminal, a first signal including at least one reference signal;
   receiving, from the terminal, a second signal through a first uplink resource corresponding to a reference signal selected by the terminal;
   identifying a physical random access channel (PRACH) resource corresponding to the reference signal selected by the terminal, based on the second signal;
   transmitting, to the terminal, a message comprising information on the PRACH resource corresponding to the reference signal selected by the terminal, based on the second signal; and
   receiving, from the terminal, a random access preamble through the PRACH resource.

7. The method of claim 6, wherein the at least one reference signal comprises at least one of a synchronization signal block (SSB) or a channel state information reference signal (CSI-RS).

8. The method of claim 6,
   wherein at least one of information on first uplink resources corresponding to each reference signal, or information on a resource through which a third signal is transmitted is transmitted through the first signal or a separate signal.

9. The method of claim 6,
   wherein the reference signal have a best signal strength among the at least one reference signal.

10. The method of claim 6, wherein the second signal is a signal having predetermined energy or a signal having a sequence shorter than a sequence of the random access preamble.

11. A terminal in a wireless communication system, the terminal comprising:
    a transceiver; and
    a controller coupled with the transceiver and configured to:
    receive, from a base station via the transceiver, a first signal including at least one reference signal,
    select a reference signal by measuring the at least one reference signal,
    transmit, to the base station, a second signal through a first uplink resource corresponding to the selected reference signal,
    receive, from the base station, a message comprising information on a physical random access channel (PRACH) resource corresponding to the selected reference signal based on the second signal, and
    transmit, to the base station, a random access preamble through the PRACH resource corresponding to the selected reference signal.

12. The terminal of claim 11, wherein the at least one reference signal comprises at least one of a synchronization signal block (SSB) or a channel state information reference signal (CSI-RS).

13. The terminal of claim 11, wherein
    at least one of information on first uplink resources corresponding to each reference signal, or information on a resource through which a third signal is transmitted is received through the first signal or a separate signal.

14. The terminal of claim 11, wherein the controller is further configured to:
    measure the at least one reference signal, and
    select the reference signal having a beset signal strength among the at least one reference signal based on the measuring of the at least one reference signal.

15. The terminal of claim 11, wherein the second signal is a signal having predetermined energy or a signal having a sequence shorter than a sequence of the random access preamble.

16. A base station in a wireless communication system, the base station comprising:
    a transceiver; and
    a controller coupled with the transceiver and configured to:
    transmit, to a terminal, a first signal including at least one reference signal,
    receive, from the terminal, a second signal through a first uplink resource corresponding to a reference signal selected by the terminal,
    identify a physical random access channel (PRACH) resource corresponding to the reference signal selected by the terminal, based on the second signal, transmit, to the terminal, a message comprising information on the PRACH resource corresponding to the reference signal selected by the terminal, based on the second signal, and receive, from the terminal, a random access preamble through the PRACH resource.

17. The base station of claim 16, wherein the at least one reference signal comprises at least one of a synchronization signal block (SSB) or a channel state information reference signal (CSI-RS).

18. The base station of claim 17, wherein at least one of information on first uplink resources corresponding to each reference signal, or information on a resource through which a third signal is transmitted, is transmitted through the first signal or a separate signal.

19. The base station of claim 16, wherein the reference signal have a best signal strength among the at least one reference signal.

20. The base station of claim 16, wherein the second signal is a signal having predetermined energy or a signal having a sequence shorter than a sequence of the random access preamble.

\* \* \* \* \*